US011769131B2

(12) United States Patent
Griffith

(10) Patent No.: US 11,769,131 B2
(45) Date of Patent: Sep. 26, 2023

(54) FINANCIAL PROCESSING AND DATA MANAGEMENT SYSTEM AND METHOD

(71) Applicant: Thomas Edward Griffith, Wichita, KS (US)

(72) Inventor: Thomas Edward Griffith, Wichita, KS (US)

(*) Notice: Subject to any disclaimer, the term of this patent is extended or adjusted under 35 U.S.C. 154(b) by 39 days.

(21) Appl. No.: 16/602,030

(22) PCT Filed: Jan. 2, 2018

(86) PCT No.: PCT/US2018/016366
§ 371 (c)(1),
(2) Date: Aug. 1, 2019

(87) PCT Pub. No.: WO2018/144685
PCT Pub. Date: Aug. 9, 2018

(65) Prior Publication Data
US 2020/0013036 A1 Jan. 9, 2020

Related U.S. Application Data

(60) Provisional application No. 62/605,287, filed on Aug. 7, 2017, provisional application No. 62/602,848, filed on May 8, 2017, provisional application No. 62/600,953, filed on Mar. 7, 2017, provisional application No. 62/499,703, filed on Feb. 2, 2017.

(51) Int. Cl.
*G06Q 20/20* (2012.01)
*G06Q 40/12* (2023.01)
*G06Q 20/32* (2012.01)

(52) U.S. Cl.
CPC .......... *G06Q 20/209* (2013.01); *G06Q 20/321* (2020.05); *G06Q 20/3265* (2020.05); *G06Q 40/12* (2013.12); *G06Q 40/125* (2013.12)

(58) Field of Classification Search
CPC combination set(s) only.
See application file for complete search history.

(56) References Cited

U.S. PATENT DOCUMENTS

| | | |
|---|---|---|
| 5,361,393 A | 11/1994 | Rossillo |
| 6,275,813 B1 | 8/2001 | Berka |
| 6,363,362 B1 | 3/2002 | Burfield et al. |
| 6,575,361 B1 | 6/2003 | Graves et al. |
| 7,305,358 B1 | 12/2007 | Sekiya |
| 7,519,547 B2 | 4/2009 | Rodriguez et al. |
| 7,578,439 B2 | 8/2009 | Graves et al. |
| 7,689,508 B2 | 3/2010 | Davis et al. |
| 7,970,669 B1 | 6/2011 | Santos |

(Continued)

OTHER PUBLICATIONS

PCT/US2018/016366, Aug. 9, 2018, Thomas E Griffith.
(Continued)

*Primary Examiner* — Scott A Zare

(57) ABSTRACT

A system for automatically processing and storing financial data using financial codes, product identifiers, point-of-sale and non-point-of-sale locations and devices, transaction cards and a financial processing and data management software program capable of processing the financial data that is associated with the financial codes into a financial report for the user of the financial processing and data management system.

27 Claims, 14 Drawing Sheets

(56) References Cited

U.S. PATENT DOCUMENTS

| | | | |
|---|---|---|---|
| 7,991,658 B2* | 8/2011 | Bond | G06Q 40/12 |
| | | | 705/30 |
| 8,086,498 B2 | 12/2011 | Rodriguez et al. | |
| 8,170,928 B2 | 5/2012 | Knowles et al. | |
| 8,477,666 B2* | 7/2013 | Astely | H04L 1/1635 |
| | | | 370/280 |
| 8,682,784 B2 | 3/2014 | Schleicher | |
| 8,695,882 B2 | 4/2014 | Halbur et al. | |
| 8,746,568 B2 | 6/2014 | Edwards | |
| 8,768,830 B1 | 7/2014 | Jorgensen et al. | |
| 8,924,294 B2 | 12/2014 | Lynch et al. | |
| 9,038,893 B2 | 5/2015 | Kirkham | |
| 9,147,186 B2 | 9/2015 | Rebin | |
| 9,154,343 B2 | 10/2015 | Noh et al. | |
| 9,563,915 B2 | 2/2017 | Brady et al. | |
| 9,569,711 B2 | 2/2017 | Nam | |
| 9,576,159 B1 | 2/2017 | Templeton et al. | |
| 9,576,280 B2 | 2/2017 | Craig et al. | |
| 9,576,310 B2 | 2/2017 | Cancro et al. | |
| 9,577,991 B2 | 2/2017 | Lebron et al. | |
| 9,633,385 B1 | 4/2017 | Ganjoo | |
| 9,672,544 B2 | 6/2017 | Kleyman | |
| 10,535,054 B1* | 1/2020 | Sptizer | G06Q 20/3223 |
| 2005/0278221 A1* | 12/2005 | Hahn-Carlson | G06Q 30/04 |
| | | | 705/16 |
| 2006/0138214 A1 | 6/2006 | Aarons | |
| 2009/0045260 A1 | 2/2009 | Blake et al. | |
| 2011/0145083 A1 | 6/2011 | Rothschild | |
| 2012/0166314 A1 | 6/2012 | Kimberg | |
| 2012/0213441 A1 | 8/2012 | Pandipati | |
| 2015/0054530 A1 | 2/2015 | Shih et al. | |
| 2016/0012548 A1* | 1/2016 | Weng | G06Q 20/202 |
| | | | 705/30 |
| 2016/0189121 A1 | 6/2016 | Best et al. | |
| 2016/0275541 A1 | 9/2016 | Postrel | |
| 2016/0335635 A1 | 11/2016 | Suzuki et al. | |
| 2017/0039562 A1 | 2/2017 | Finley | |
| 2017/0161709 A1* | 6/2017 | Tunnell | G06Q 20/401 |

OTHER PUBLICATIONS

U.S. Appl. No. 62/605,287, filed Aug. 7, 2017, Thomas E Griffith.
U.S. Appl. No. 62/602,848, filed May 8, 2017, Thomas E Griffith.
U.S. Appl. No. 62/600,953, filed Mar. 7, 2017, Thomas E Griffith.
U.S. Appl. No. 62/499,703, filed Feb. 2, 2017, Thomas E Griffith.

* cited by examiner

901 →

Receipt

| 902 → | 903 → | 904 → |
|---|---|---|
| FC 001 Store Name<br>Acme hardware | FC 004 Transaction number<br>54321 sale | FC 002 Data   FC 003 Time<br>08/02/17      09:45:56 |

| 905<br>Item Name | 906<br>Financial code | 907<br>Financial code category | 908<br>005 Price |
|---|---|---|---|
| 1. Hammer | 111 | Tools | 005   12.95 |
| 2. Paint | 205 | Material | 005   8.75 |
| 3. Bug spray | 301 | Pesticide | 005   6.95 |
| 4. Nails | 261 | Fasteners | 005   7.99 |
| 5. Bolts | 261 | Fasteners | 005   6.00 |
| 6. Pencils | 425 | Office supplies | 005   8.00 |
| 7. Paper | 425 | Office supplies | 005   8.95 |
| 8. Drill | 119 | Electric hand tools | 005   29.95 |
| 9. Plexiglass | 205 | Material | 005   18.99 |
| 10. Scotch tape | 425 | Office supplies | 005   3.99 |
| 11. Carpet tape | 261 | Fastener | 005   6.99 |
| 12. Potato chips | 521 | Food /snacks | 005   1.75 |
| 13. Candy Bar | 521 | Food / snacks | 005   1.50 |
| 14. Chain saw | 122D07I | Commercial Tool D07 | 005   895.00 |

909 →

Payment method
FC 015  Check 6752

FC 006   Sub-Total              1017.76
FC 007   Sales Tax     .0735    74.80
FC 008   Total                  1090.96

910 →

Transaction card or device 4234 5678 9012 3456     Acct. No.

FC 021   Company name   Joe's
FC 022   Employee ID          17
FC 023   Vehicle ID               03
FC 024   Language         Spanish

911 →

FC 001 ABC Hardware Receipt

| Name<br>(905) | FC<br>(906) | Category<br>(907) | Price<br>(908) |
|---|---|---|---|
| Tape measure | 111 | Tools | 11.99 |
| Oil filer | 512 | Auto | 7.95 |
| Garden Hose | 365 | Garden | 25.99 |
| Oil | 512 | Auto | 4.50 |

Change Financial Code

| 1102 | | | |
|---|---|---|---|
| Store name | All | | |

| 1103 | | 1104 | |
|---|---|---|---|
| Financial code to be combined | 401-435 | All | Edit |

| 1105 | | 1106 |
|---|---|---|
| Financial code to be combined into | 425 | Enter |

Depreciation

| 1202 | | 1203 | | 1204 | |
|---|---|---|---|---|---|
| 7 Years | | 5 Years | | 3 years | ▲▼ |
| Chain Saw | 895.00 | Chain Saw | 895.00 | Chain Saw | 895.00 |
| Sales tax | 65.79 | Sales tax | 65.79 | Sales tax | 65.79 |
| Total | 960.79 | Total | 960.79 | Total | 960.79 |
| Yearly | 137.26 | Yearly | 192.16 | Yearly | 320.27 |

1205
Enter

Fig. 12

FINANCIAL PROCESSING AND DATA MANAGEMENT SYSTEM AND METHOD

CROSS-REFERENCE TO RELATED APPLICATIONS

This application is a U.S. National Stage Application of PCT/US2018/016366, filed Aug. 1, 2019, which claims priority in U.S. Provisional Patent Application No. 62/605,287, filed Aug. 7, 2017, and also claims priority in U.S. Provisional Patent Application No. 62/602,848, filed May 8, 2017, and also claims priority in U.S. Provisional Patent Application No. 62/600,953, filed Mar. 7, 2017, and also claims priority in U.S. Provisional Patent Application No. 62/499,703, filed Feb. 2, 2017, all of which are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The technical field the invention relates to is the electronic transmission and storage of data with computers, and servers, associated with point-of-sale and non point-of-sale locations.

Description of the Related Art

Currently, various methods and systems have been developed to facilitate various aspects of managing the financial information of the users.

There are some systems and methods that exist in the prior art that transmit an electronic receipt for a purchase made at a merchant's store by e-mail to the user who made the purchase Some systems and methods permit an electronic receipt to be stored directly onto a smart card or another physical device. However, the electronic receipts of such systems contain limited information that excludes important financial information of use to the user.

This specification recognizes that there is a need for a method for automatically processing and managing financial data.

SUMMARY

A method for processing and managing financial data is provided, as shown in and/or described in connection with at least one of the figures.

One aspect of the present disclosure relates to a method for processing and managing financial data. The method includes steps of extracting financial data at a point-of-sale, and at a non-point of-sale using one or more of a plurality of financial codes, a plurality of product identifiers, a plurality of transaction cards, a plurality of point-of-sale computers, a plurality of non-point-of-sale computers and a plurality of associated devices; inputting the financial data into a financial processing and data management system to create a financial report; and storing the financial data for the user wherein the financial codes are used to identify, categorize and manipulate data associated with one or more of a plurality of products, a plurality of purchases, a plurality of services, a plurality of transactions, banking, credit, one or more investments, one or more of loans, a plurality of securities, a plurality of contracts, a plurality of agreements, a plurality of accounts, one or more users, taxes, shipping, a plurality of routing codes and information associated with a financial exchange and/or manipulation of money or information, with the financial codes being interrelated to one or more of bookkeeping, accounting, budgeting, inventorying, payroll, and tax preparation, wherein the product identifiers are used to identify locate, store, and allow the extraction of the financial codes and data encoded into the product identifiers, wherein the transaction card containing a plurality of account numbers, a plurality of routing numbers, and a plurality of addresses on the user of the financial processing and data management system, so that said transaction card is used for initiating the transmission of data between a plurality of electronic interfaces relating to one or more a plurality of computers, a plurality of servers, the point-of-sales, a plurality of mobile phones wireless devices, and the financial processing and data management software, wherein the point-of-sale is capable of scanning and processing the product identifier, the transaction card, and/or other devices containing either machine or human readable information so that the information and a plurality of associated financial codes are extracted from a plurality of aforementioned mediums; then combined with sales data and transmitted to the financial processing and data management software, wherein the data from the non-point-of-sale is related to either financial information or non-financial information in which said information is identified with the financial codes and then said information is transmitted and/or inputted into the financial processing and data management software, wherein the financial processing and data management software is capable of automatically receiving and processing an electronic transmission of financial data and other information derived from the point-of-sale and the non point-of-sale sources, in which, said financial data and other information is identified by said financial codes with said financial codes being used as instructions by the financial processing and data management software to store said financial data to a memory or use said financial codes to parse, manipulate and organize the financial data into one or more of an accounting, bookkeeping, budgeting, inventorying, payroll, or tax preparation format.

These features and advantages of the present disclosure may be appreciated by reviewing the following description of the present specification along with the accompanying figures wherein like reference numerals refer to like elements.

BRIEF DESCRIPTION OF THE DRAWINGS

FIG. 9 illustrates two hypothetical receipts from a POS and a transaction card with references to FIGS. 4,5 and 6 in accordance with at least one embodiment of the claimed subject matter.

With reference to FIG. 9 in accordance with at least one embodiment of the claimed subject matter.

FIG. 11 illustrates a method to reduce the number of FCs categories down to the specific categories a business uses. With reference to FIG. 9 in accordance with at least one embodiment of the claimed subject matter.

FIG. 12 shows further embodiments describing inserting a FC representing a function into or associating with the product identifier in accordance with at least one embodiment of the claimed subject matter.

DETAILED DESCRIPTION

Figure 1:
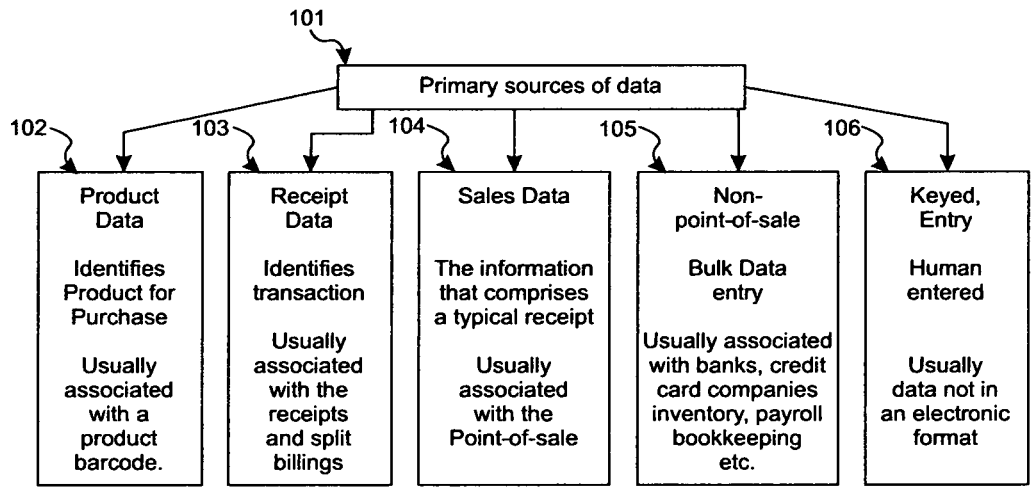
FIG. 1 illustrates a block diagram of the various sources for the primary data used by the present method for automatically processing and managing financial data in accordance with at least one embodiment of the claimed subject matter.

The present description is best understood with reference to the detailed figures and detailed description set forth herein. Various embodiments of the present system and method have been discussed with reference to the figures. However, those skilled in the art will readily appreciate that the detailed description provided herein with respect to the figures are merely for explanatory purposes and the present systems and methods will extend beyond the described embodiments. For instance, the teachings presented herein as well as the needs of any particular application may yield multiple alternative and suitable approaches to implement the functionality of any detail of the present systems and methods described herein. Therefore, any approach to implement the present system and method may extend beyond certain implementation choices in the following embodiments.

According to the described embodiments, the methods of the inventive subject matter may be implemented by performing or completing manually, automatically, and/or any combination thereof. The term "method" refers to manners, means, techniques and procedures for accomplishing any task including, but not limited to, those manners, means, techniques, and procedures either known to the person skilled in the art or readily developed from existing manners, means, techniques and procedures by practitioners of the art to which the present inventive subject matter belongs. The persons skilled in the art will envision many other possible variations within the scope of the present system and method described herein.

The invention starts with the development of a set of financial codes that are applied to just about everything to identify products, functions and other data. Then the development of a software program that can manipulate the financial codes and any data the financial codes identify. The financial codes are then associated with a product barcode or device. The user purchases a product, scans the barcode, rings up the sale, pays for the product, then scans their transaction card, the data is then sent to a financial processing and data management software program to be processed into a financial report. This operation is similar to how a credit card works. Except, there is no payment tied to the transaction card only the transaction is processed. Also since there is no payment involved the invention can move beyond the point-of-sale. Not having to process the payment means there is no need to process money simplifying and reducing the cost of the transmission process between the point-of-sale and the financial processing and data management software.

The ideal method for how the invention would be processed is according to an individual's or business's own needs. The business can put the financial processing and data management software on their computer if they want, and manage and learn the details of managing the system themselves. The inventor prefers a bank or similar financial company to manage the software for multiple businesses or entities. The user accesses the system via the internet. This method does not require the business owner to buy or learn how to operate the financial processing and data management software. When setting up the software the user goes to their bank or other entity, signs up for the program for 30 dollars a month. Then sits down with a person to set up the account where they ask you 20 or 30 questions on how your business functions, gives you the transaction card with an account number on it and your done. Then you go out and buy something paying for it any way you want. Then use the transaction card to have the transaction data sent to your account financial processing and data management software account. After a month, you go back to the bank or system manager and make adjustments if necessary. Eventually the system becomes fully automated, producing a financial report of an accounting bookkeeping, budgeting or tax preparation format. All the user has to do is swipe their transaction card when they purchase something.

Further embodiments at 101, are short descriptions of the primary sources of data used in the invention. The first two sources are product barcodes 102 and transaction barcodes 103. The information barcode is generally not used (not shown) in this invention if it is used it would most likely refer back to the product barcode 102 or the transaction barcode 103. The third data source is sales data 104 from the point-of-sale 205 (POS). The fourth data type is non-point-of-sale 206 (Non-POS) data or bulk data not usually associated with barcodes or POSs 205. The fifth data source is keyed or human entered data 106.

At 102, is product data 102, that usually is embedded in or associated with a barcode, QR code or some other device whose purpose is to identify a product for purchase. Barcodes are usually scanned at a POS 205 so the product data can be entered into the POS 205. The invention processes barcodes in one of three ways. 1. The financial codes 202 (FCs) can be embedded in the barcode, when the barcode is scanned at the POS 205 the product information along with the FCs 202 will be extracted and inputted into the POS 205 transaction data. 2. The product barcode 202 is scanned at the POS 205 and the product information is extracted and used to locate the FCs 202 stored in the POS's 205 memory so the FCs 202 can be combined into the transaction data 308. 3. The product barcode or product identifier 202 is scanned at the POS 205, and the product information is extracted and used to locate the FCs 202 that are stored on the cloud or a remote server accessible by the POS 205 via the internet, so that the FCs 202 can be retrieved and combined into the transaction data 308.

At 103, is receipt data 103, that can be embedded in a barcode, QR code, et cetera, and is used to identify sales data 104 created at the POS 205 or other locations where a transaction occurred. Data on a completed sale or purchase includes things like sales tax, products purchased, dates, price, totals, store name in addition to data extracted from or associated with the product identifier 203, including financial codes 202. Usually this type of barcode is used for creating some type of receipt or split billing such as an invoice. When sales data 104 is converted to a machine scannable or readable barcode, QR code or other device it is called a transaction barcode 204. Businesses are now printing out transaction barcodes 204 on a paper receipts or transmitting an electronic version by e-mail to the customer. Some businesses are also creating electronic projections of a transaction barcode 204 and transmitting it to the POS 205 customer interface, where the customer uses their mobile phone or other device to scan or photograph the transaction barcode 204 on the POS 205 customer interface. This invention has the possibility of making some versions of the transaction barcode 204 obsolete.

At 104 sales data 104 is created at a typical POS 205 transaction, this could be either a retail or wholesale transaction. Sales data 104 usually consist of the information extracted or associated with the product identifier 102 and the data comprising a typical receipt, such as price, sub-total, total, sales tax, store ID, date, transaction number, et cetera. The invention can identify all the data comprising the sales data 104 with financial codes 202. Sales data 104 and receipt data 103, are same, however for this invention there are differences in the methods used for processing. The receipt data 103 uses a variety of methods including keyed entry 106 and the transaction barcode 204 to input the data into the FPS 208. While, sales data is directly entered into the FPS 208 from the POS 205

At 105 is the representation of inputted data the invention refers to as Non-POS 105 data. This type of data is not directly related to a purchase, but derived from data relating to entities, products or other financial data such as, but not limited to, banking, credit card companies, credit unions, accounting, inventory, payroll, bookkeeping, warranties, service manuals et cetera. Non-POS 206 data can also be identified with the financial codes 202.

At 106 is the keyed or human entered data 106 inputted into the financial processing and data management software (FPS) 208 that is not in an electronic format and so has to be entered by hand or rescanned. This includes the scanning of transaction barcodes 204 or using OCR (optical character recognition) to read receipts and transaction barcodes 204, particularly those of a split billing nature such as invoicing and other billings.

Figure 2:
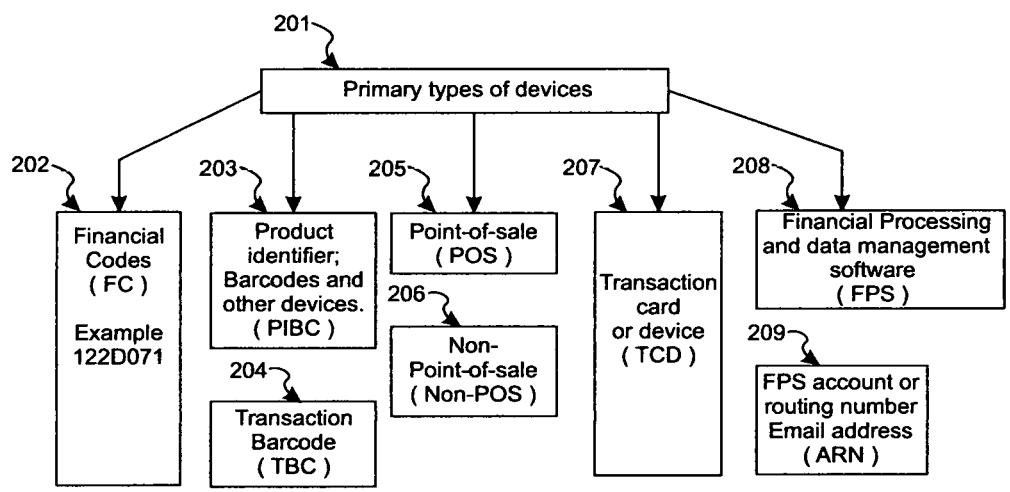
FIG. 2 illustrates a block diagram of the various primary types of devices in accordance with at least one embodiment of the claimed subject matter.

Further embodiments in FIG. 2 include a list of the primary types of devices used in the invention. With reference to FIG. 1 and FIG. 9. FIG. 2 is also a list of all the abbreviations used in the invention.

The primary types of devices or systems used in the invention are financial codes 202, product identifiers 203 and transaction barcodes 204, POS 205 and Non-POS 206 hardware and software, the transaction card or device (TCD) 207, and the financial processing and data management software (FPS) 208.

At 202 are the financial codes (FCs) 202. FCs are designed to be embedded or associated with all the primary sources of data in FIG. 1, for the purpose of, identifying the data as a whole or parsed. In FIG. 2 are the primary devices that embed, extract, combine, transmit and in general manipulate the FCs 202 so the FCs 202 and associated data can be inputted into the FPS 208.

The FCs 202 are designed to identify products and data related to transactions, categories and functions that are interrelated to, but not limited to, accounting, bookkeeping, budgeting, inventory, payroll and tax preparation. Categories could be, but not limited to office supplies, auto expense, and advertising. Functions could be, but not limited to, depreciation, sales tax, or amortization. Data could be, but not limited to, name of store, date, price, product name, and total. The products could be real estate transactions, insurance transactions, electric bills, securities transactions or retail transactions, warranties, service manuals, et cetera. A visual representation of a hypothetical FC 202 could be something like, "122 D07I". In this instance 122 represents the category of commercial tools, the "D" represents depreciation, and the 07 represents the number of years to depreciate the tool. The "I" represents information. (See FIG. 9-12)

In the perspective of the invention in short, the FCs 202 are designed to identify everything that is bought or sold, processed or exchanged, for the purpose of, inputting the data into the financial processing and data management software 208 so that the data can be processed accordingly.

At 203 is the product identifier more commonly known as barcodes, QR codes et cetera. The product barcode 203 predominates at the retail and wholesale levels where the origination point of the information in or associated with the product identifier 203 is the manufacturer 401. The financial codes 202 can be embedded or associated with the product identifier 203.

The transaction barcode 204 is useful for services, split billings, internet, phone sales and other areas where the product or service is not originated at the manufacturer 401 and a transaction barcode 103 or receipt is needed. The origination point of the data associated with the transaction barcode is usually the POS 205 or Non-POS 204 after the sale has been completed.

At 205 is the POS 205 locations and activities, where financial data and other information is created and identified by the FCs 202 and then transmitted to the FPS 208. POS 205 locations could be, but not limited to any locations or activities involving retail, wholesale, internet, phone, services, billings, mobile devices, securities transactions, services, and any place data or money is exchanged or processed. All of these devices or entities can have customized software and templates designed to quickly input data and associate the data with the FCs 202 then transmit the data to the FPS 208

Non-POS 206 locations or activities could be, but not limited to, banks, credit card companies, inventory management, payroll, wire transfers, accounting and bookkeeping information, product information and other data or any place involved in the financial management or manipulation of money or data. All of these entities or types of data can have customized software and templates designed to quickly input data and associate the data with the FCs 202 and transmit the data to the FPS 208

At 207 is the transaction card or device (TCD). The TCD 207 can be any device capable of storing the user's FPS's 206 account and/or routing number or email address (ARN) 209. If the user is at a location with no electronic scanner, then the ARN 209 can be visibly read off the card, the same as a credit or debit card. The TCD 207 only needs the ARN 209 of the FPS 208 encoded into it or on it, so the transaction data or other information can be extracted and transmitted to the FPS 208 account. There is no payment account or payment method tied to the TCD 207. This allows the user to use whatever form of payment they want. It also allows the invention to expand beyond the POS 205 and the processing of receipts to the processing and storing of Non-POS data. All the data contained in the TCD is identifiable with a financial code 202.

At 208 is the financial processing and data management software (FPS) 208. The FPS 208 is designed to read the FCs 202 associated with the sales data 104 and other data being transmitted from the POS 205 or Non-POS 206. The FPS 208 utilizes the FCs 202 as instructions on how to process the data associated with the FCs 202. Example: The FC 202 of "122D07I", is not arriving alone, all the other data on the receipt is also available and identified by FCs 202. In this instance the name of the product, a chain saw was encoded by the manufacturer 401. The manufacture also encoded the category 122, which represents commercial tools, the "D" represents depreciation and the 07 represents the number of years to depreciate the chainsaw. The "I" represents information is available. The price from the sales data 104 was also identified by a FC 202, which was encoded by the retailer at 960.00 dollars. When this data arrives at the FPS 208, the FPS 208 now has the instructions to fully process the chain saw into a financial report 313.

At 209 is the FPS's 208 account number, routing number or email address 209 (ARN).

Figure 3:
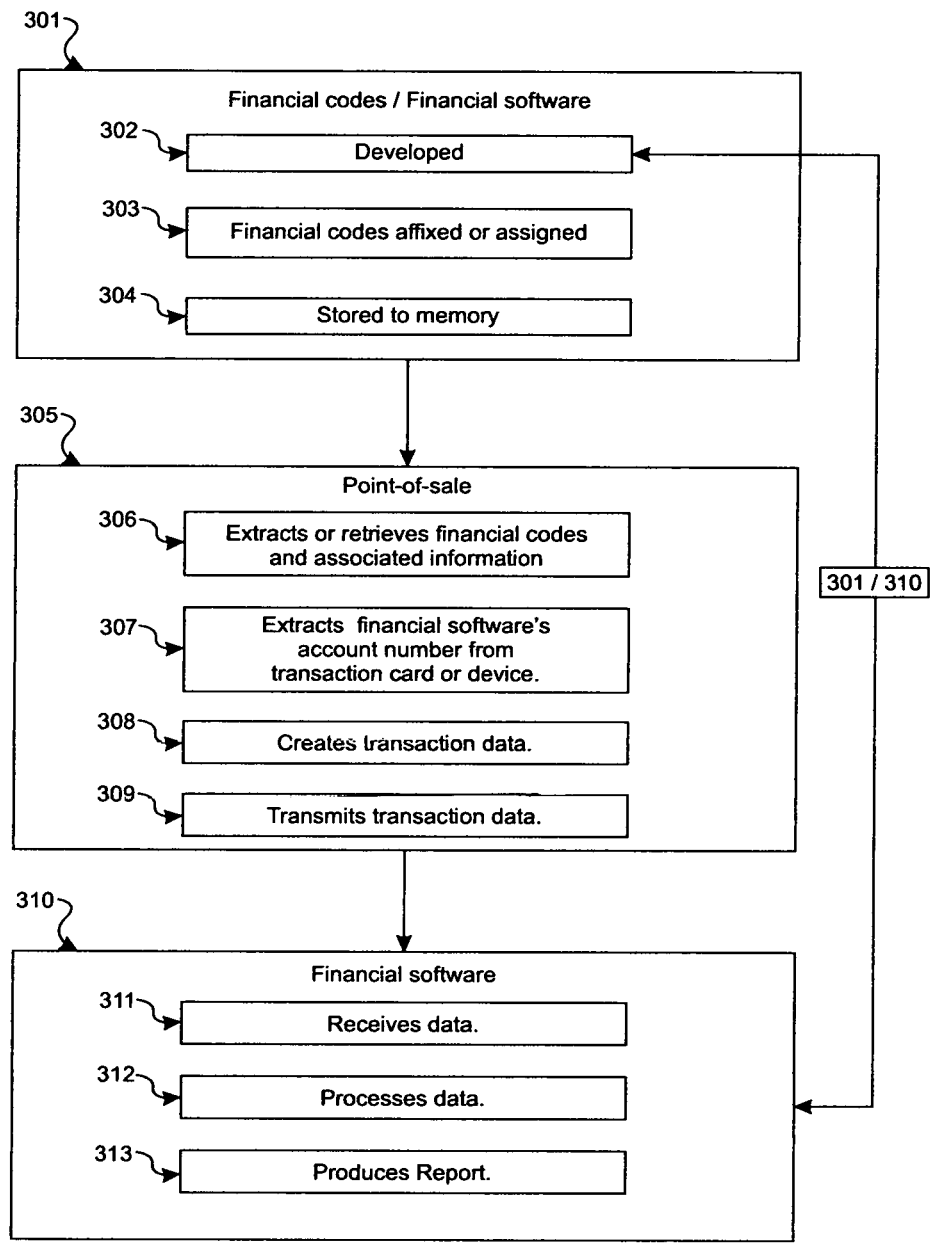
FIG. 3 illustrates a flow chart showing the processes of the basic invention involving a basic point-of-sale (POS) in accordance with at least one embodiment of the claimed subject matter.

Embodiments at FIG. 3 include a flow chart showing the processes of the basic invention involving a basic POS 205.

At 301, the FPS 208 and the financial codes 202 are developed.

At 302 the FCs 202 are developed in conjunction with the FPS 208. The FCs 202 can be encoded into the product identifier, stored to memory or printed out. The FCs 202 are designed to convey a set of instructions to the FPS 208. The FPS 208 after being developed shills to the end of the invention as seen in 301/310 where it will identify and process the financial information according to the FCs 202.

At 303 FCs 202 are assigned or affixed to a manufactured product or service. Manufacturers 401 are aware of how their products are used. They know a roll of clear tape is going to be used in an office so a financial code 202 of office supplies can be assigned to it. Expensive items have product warranties and registrations where the manufacturer 401 can ask the user questions about depreciation and other factors that might be encoded into a FC 202. The financial codes 202 can be embedded in a product identifier 203 or associated with the product in a manner that the FC's can be located or accessed from the POS 205 or internet.

At 304, the FCs 202 can be stored to the memory of the POS 205 hardware and software, mobile phones, wireless devices, remote servers, the cloud and other computers or electronic devices associated with the invention to improve the functionality of the invention. These FCs 202 can be accessed at the time of a transaction and then inputted into the sales data 104.

The POS 205 is updated at 305 to identify and process the FCs 202 and the TCD 207. Each individual company or individual experienced in their POSs 205 can incorporate their own methods into their products to utilize the FCs 202 and other devices associated with this invention. All the data created or passing through the POS can be identified with the FCs.

At 306, the POS 205 scans and extracts the information from the product identifier, 203 including any FCs, 202 or by scanning the product identifier 203 and associating the data extracted with a database of FCs 202 stored to the memory of the POS 205 a remote server or on the cloud accessible via the internet.

At 307, the FPS's 208 ARN 209 is inputted into the POS 205 transaction data 308, after being extracted from the TCD 207, retrieved from memory or inputted by keyed entry 106. The function of the TCD 207 is simple it carries the ARN 209 of the FPS 208 account. When the POS 205 formulated the sales data 104 the TCD 207 is swiped and the ARN 209 and other information is extracted and added to the sales data 104 to create transaction data 308.

At 308, the POS 205 creates transaction data 308 by combining information from the sales data, 104 the product identifier 203, and information on the TCD. The FCs 202 can identify all the data encoded into the transaction data 308. 307 and 308 are interchangeable. Most POSs 205 are flexible enough to allow the scanning of the transaction card 207 at any point in the transaction.

At 309 after verification of the FPS's 208 ARN 209 that was extracted from the TCD, the POS 205 transmits the transaction data 308 to the FPS 208.

At 310, the FPS 208 can be managed by any entity capable of managing the FPS 208, including the user. Since the FPS 208 and associated methods are about the transaction and not about payment, the FPS 208 is not restricted to companies associated with payment type accounts, such as banks and credit card companies. It is possible for payment type entities to manage the FPS 208 as a separate account.

At 311, the FPS 208 receives the transaction data 308 from the POS 205 including the FCs 202 associated with the data. Mobile devices or other electronic interfaces connected to or transmitting to the FPS 208 can also act as POS 205.

At 312, the FPS 208 processes the transaction data 308 using the FCs 202 as instructions or identifiers to parse, categorize, organize or reconcile the transaction data 308 with past and present data and allows additional data to be inputted later to create an ongoing financial report.

At 313, the FPS 208 produces a financial report 313 of an accounting, bookkeeping, budgeting, inventorying or tax preparation format or any combination thereof with minimal or no human interaction due to the FCs 202 being inputted into the process by the manufacturer 401 and/or merchant selling a product.

Figure 4:
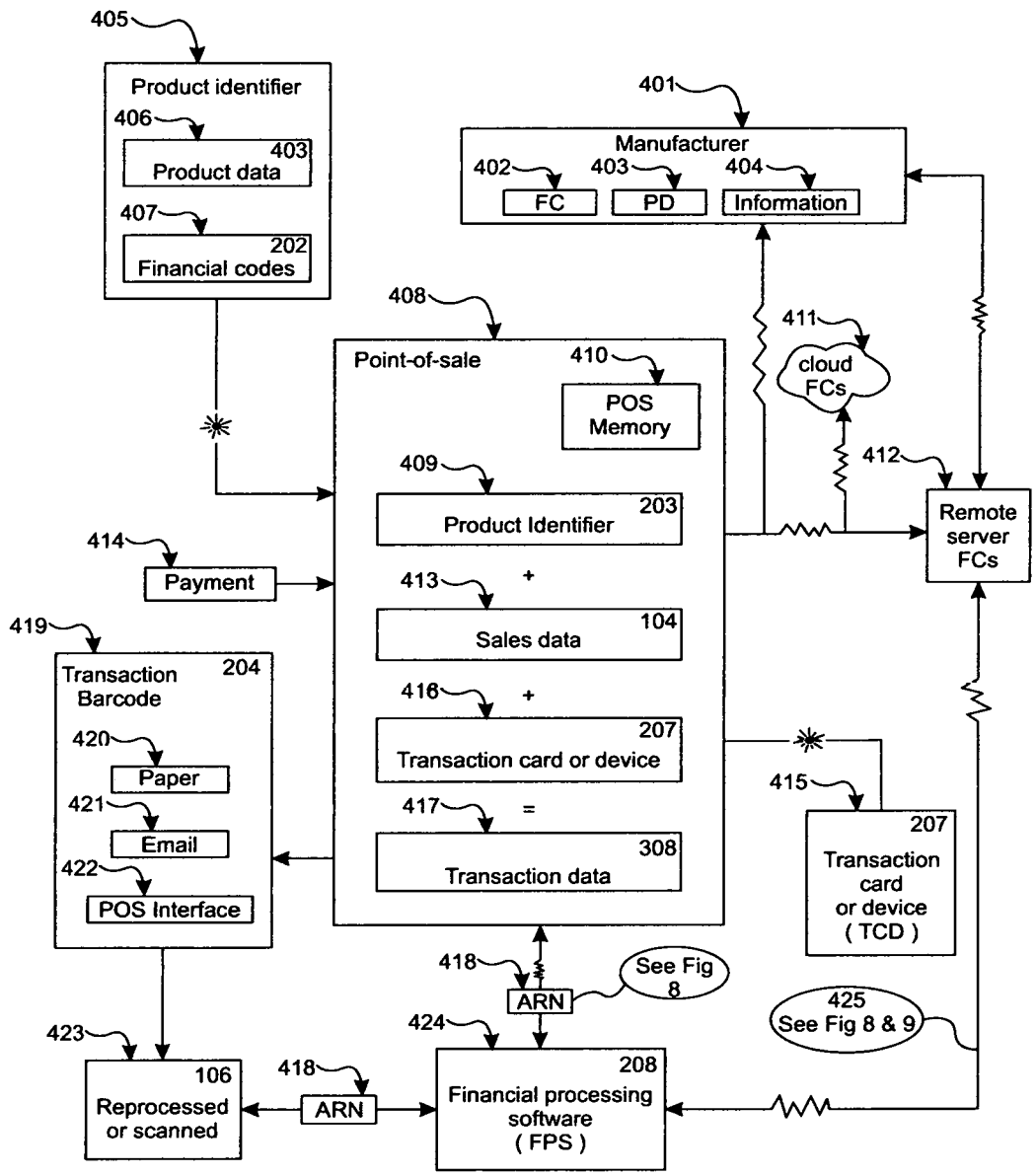
FIG. 4 illustrates a flow chart of the invention as it is processed through a typical POS in accordance with at least one embodiment of the claimed subject matter.

Further embodiments at FIG. 4 include a flow chart of the invention as it is processed through a typical POS 205

At 401 is the manufacturer 401 that produces a product and assigns three types of data to the product; the FCs 402, product data 403 and product information 405. The FCs are as described at 202. The product data 403 consist of the basic data that currently goes into a barcode such as the manufacturer 401 name and the name of the product. The information 404 consist of product manuals, warranties, and other bulk information associated with the product or manufacturer 401 which is stored to the server or computer memory for remote access by the POS 408 or a remote server 412.

At 405 the manufacturer 401 combines the product data 406 and the FCs 407 to create a product identifier 405 in which the FCs 402 are affixed or associated with the product in a manner that they can be extracted upon scanning of the product identifier 405 or the FCs 402 can be located by using the product data 403 extracted at the time of scanning the product identifier 405 by the POS 408 and the POS 408 using the product data 403 to locate the FCs 402.

The term customer and user are the same entity and are interchangeable, however customer is usually used when referring to the POS 408 and user is usually used when referring to the FPS 424. This is the same for all the figures.

At 408 at the time a product is purchased by the user, the product identifier 405 is scanned. The product data 406 is extracted including any FCs 407 if present. If the product identifier's FCs 402 are not present, the POS 408 can locate the FCs 402 using one of following methods. The POS 408 can store the FCs 402 to memory 410, which is accessible by using the product data 406 in the product identifier 405 to locate and retrieve the FCs 402 stored in the POS's 408 memory 410. If no FC 402 can be located the POS 408 can assign a FC 202 of miscellaneous to the sales data 413 for the product. The FCs 402 can be located on the cloud 411 a remote server 412 or the manufacturer's 401 server or computer, by the POS 408 using information extracted from the product identifier 405. The POS 408 can also locate product information 404 using the same methods. The transmission link between the manufacturer 401 and the remote server 412 shows that additional remote servers 412 can be linked between the POS 408 and the manufacture 401 when the POS is locating manufacturer 401 information 404 or manufacturer 401 associated FCs 402.

After the FCs 407 are retrieved or extracted, the data comprising the product identifier 409, the FCs 402 can be inserted into the sales data 413 along with the product data 403.

The POS 408 creates the sales data 413 by combining pricing and receipt information from the POS 408 transaction, with information derived from the product identifier 405. Each individual component of the sales data 413 can be identified with FCs 202 including but not limited to, name of POS 408, date, product purchased, transaction number, price, sub-total, sales tax, total, and FCs associated with all of the aforementioned.

At 414 after the sales data 413 has been created, any method of payment 414 can be used to pay for the purchase, because the transaction card 415 and the FPS 424 are not methods of payment 414. The FPS 424 and the transaction card 415, process the transaction, not the payment 414, as other credit and debit cards do. As a result, the sales data 413 will identify the method of payment 414 used with a FC 202, so the FPS 424 can identify the method of payment 144 when processing the transaction data 417 from the POS 408. If the TCD 415 has multiple accounts to transmit data to and one of those accounts are a payment account. The POS 408 can process the payment through the payment account on the TCD 415.

At 416 the transaction card or device (TCD) 415 is swiped by the user at the POS 408 and the data embedded in the TCD 415 is extracted and inputted into the sales data 413 to create transaction data 417. POSs 408 are now versatile enough that the TCD 415 can be swiped at any point in the transaction, payment 414 does need to be made before any data is transmitted.

The POS 408 scans or extracts information from the TCD 415 by using, machine and or human readable methods such as but not limited to; card or chip scanners, RFID scanners, optical scanners, methods involving blue tooth, nearfield, other methods or actions, necessary to input the TCD 415 data into the POS's 408 transaction data 417. The data extracted from the TCD 415 can be but not limited to, name of user, vehicle information, work information, user language and the account number, routing number, or address 209 (ARN) identifying the FPS 424 which the transaction data 417 will be transmitted too.

At 417 after the transaction data 417 has been formulated, the POS 408 can directly transmit the transaction data 417 to the FPS 424 via the internet or other means of communication. The POS 408 extracted the ARN 209 from the TCD 415 and transmits the ARN 209 to the FPS 424. The FPS 424 identifies the ARN 209 as valid or invalid and transmits a valid or invalid ARN 209 code back to the POS 408. If the ARN 209 is valid then the POS transmits the transaction data to the FPS 424 for processing. If the ARN 209 code is invalid the invalid ARN 209 will be received by the POS 408 and the POS 408 will respond by notifying the user and not transmitting the transaction data 417 and the processes of the invention will end. The POS 408 will complete the transaction with the user because the payment 414 has already been made.

The POS 408 can convert the transaction data 417 into a transaction barcode 419 containing the FCs 202 in the form of a paper receipt 420, an electronic email receipt 421 or an electronic projection 422 on the POS 408 customer interface. The transaction barcode 419 in the form of an electronic projection 422 can be scanned or read by the user's mobile phone or device and then transmitted to the POS 408 by the use of an app. If the user is using their mobile phone as the FPS 424 it would be directly entered into the FPS 424 when scanned.

At 423 is human entered data 106. The transaction data 417 in the form of a paper receipt 420 can be rescanned or OCR (optical character recognition) can be used to identify the transaction data 417 on the paper receipt 420 and the inputted into the FPS 424. The email receipt 421 containing the transaction data 417 can be entered into the POS 408 upon opening the email 421 and sending it to the FPS 424. If the transaction barcodes 419 are being entered from a remote location the entry of the ARN 209 would be necessary to identify the incoming data as being associated with a valid FPS 424 account.

At 424 is the FPS 424. The FPS 424 processes or stores any data being transmitted to it.

There is an electronic transmission loop 425 between the manufacturer 401, POS 408, the remote server 412 and the FPS 424. The purpose of this loop 425 is the transmission of information 404 from the manufacture 401 to the FPS 424. See FIGS. 8 & 9.

Figure 5:
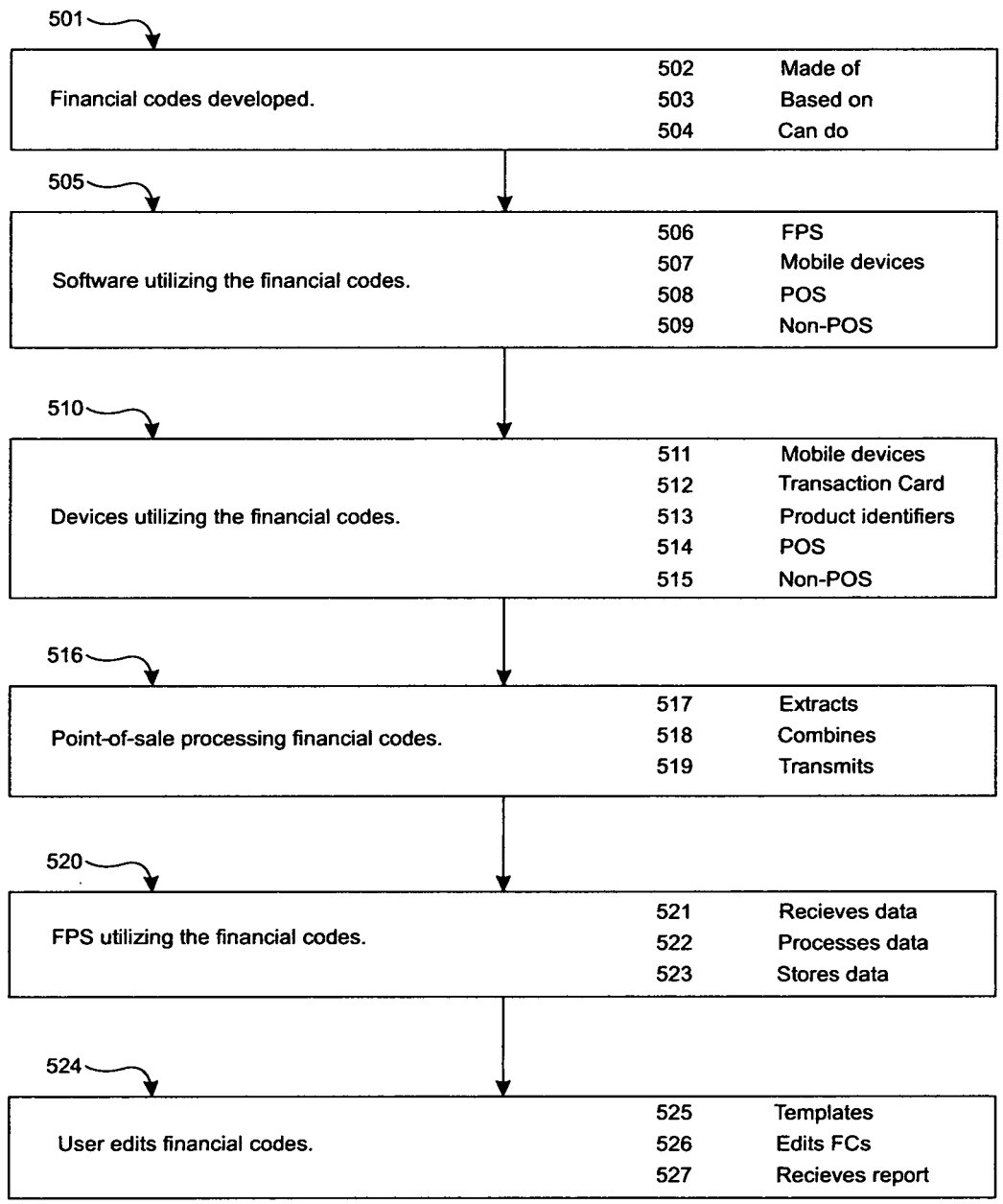
FIG. 5 illustrates a flow chart of how the financial codes (FCs) are developed and how they function and are processed through the invention in accordance with at least one embodiment of the claimed subject matter.

Further embodiments at FIG. 5 include a flow chart of how the financial codes 202 (FCs) are developed and how they function and are processed through the invention.

At 501, a set of FCs 202 are developed that are machine and/or human readable. Said financial codes are designed to identify data and can be interrelated to accounting, bookkeeping, tax preparation and other financial functions. Said financial codes can also identify both POS and Non-POS 206 data.

At 502 the FCs 202 can be printed or take the shape of any one dimensional, two dimensional or three dimensional form and be comprised of any material or substance. The financial codes 202 can be designed to be encoded into an existing method of product identification 203, such as but not limited to; barcodes, QR codes, smart labels, RFID devices, or a new method of identifying products, and services.

At 503, the FCs 202 could be based on, but not limited to, numbers, letters, symbols, words, abbreviations or character sets associated with, but not limited to Unicode or ASCII.

Different sets or formats of FCs 202 can be developed to function with different types of product identifiers, 203 barcodes or data. Individual FCs 202 representing a category, function or data in one country could be used for a different category or function in another country and/or political jurisdiction.

At 504 individual FCs 202 can be used to identify products, services, categories, functions, data or other information inputted into or related to POS 205 or Non-POS 206 transactions or activities and the transmission and organization of data.

Products identified by FCs 202 could include wholesale and retail products. Services identified or using FCs 202 could include, but not limited to plumbing, legal, bookkeeping, insurance, utilities, auto repair, et cetera. Categories identified by FCs 202 could include, but not limited to, tools, office supplies, work clothing, and materials, auto expense, et cetera. Functions involve a relationship that require a variable, such as, but not limited to depreciation, amortization, interest, sales tax et cetera. Data includes information that is not intended to change, such as but not limited to, final totals, names, addresses, employee identification, et cetera.

FCs 202 can be used to identify or be associated with both wholesale and retail POSs 205 such as but not limited to, brick and mortar, internet, catalog, telephone sales or could be associated with Non-POS 206 transactions such as, but not limited to banking, credit, securities, wire transfers, payroll, accounting, inventory, warranties, service manuals, shipping, electronic data transfers and other information. FCs 202 can be used to identify information related to the methods, products, and devices used in the service industry. The FCs 202 can be used to identify information related all forms of business to business transactions, business to personal transactions and personal transactions.

The FCs 202 can be used to identify all methods of payment including, but not limited to, cash, check, credit, debit card transactions at the POS 205 other locations. The FCs 202 can also be used to identify invoicing and automatic billing transactions.

At 506, the FPS 208 is created to utilize the FCs 202. The FPS 208 identifies the FCs 202 and any information associated with them. The FPS 208 utilizes FCs 202 associated with products and other transaction data 308 to parse, compile, organize and/or reconcile the transaction data 308 or other information inputted into the FPS 208.

At 507, applications capable of utilizing and processing the FCs 202 and the invention can be created to function with all types of mobile phones and other wireless devices so that mobile and other wireless devices can be used as a POS 205 Non-POS 206.

At 508, the POS 205 is being updated to identify and process the FCs. The POS 205 extracts the FCs 202 from product identifier, 203, TCD 207. The POS 205 can store the FCs 202 to memory or access the FCs 202 via the internet on a remote server or the cloud. The POS 205 uses the FCs 202 to identify the sales data 104 created at the time of purchase. The POS 205 combines all the data identified by the FCs 202 from all of the aforementioned, and combines it into transaction data 308 and then transmits the transaction data 308 to the FPS 208 or the POS can create a transaction barcode 204. POSs 205 related to the service industry or other businesses can have templates designed to quickly process the FCs 202 so that their specialized needs can be met.

At 509, the FCs 202 can be used to identify Non-POS 206 data that is transmitted from Non-POS 206 sources so that the Non-POS 206 data can be processed by the FPS 208. Non-POS 206 entities and devices including computers, mobile phones and other wireless devices can have applications, software and templates designed for their specific needs so that the invention can be quickly processed and transmitted. The financial codes can be stored to memory of all the computers, servers and devices associated with Non-POS transaction to facilitate the invention.

510 represents the devices, processing the FCs 202, The FCs 202 can be designed to function with any machine and/or human readable electronic, magnetic, digital, optical or physical device that can store or access information or process the FCS and associated data, including human manipulation of the financial codes 202 and associated information.

At 511, mobile and wireless devices can be used as both POSs 205 and Non-POSs 206 by using applications and other software installed to function with the financial codes 202.

At 512, is the TCD 207, of which the data embedded it, is identified by FCs 202. Miniature devices such as rings, watches, et cetera can be used to act as a TCD 207 utilizing the FCs 202.

At 513, the FCs 202 can be incorporated, encoded or associated with existing methods of product identification 203 such as but not limited to barcodes, QR codes, smart labels RFID devices, etc. or a new method of product identification 203. FCs 202 can be stored to the memory of any computer, server, mobile phone, wireless, or other devices involved in the implementation of the invention. FCs 202 could also be stored to the cloud or a remote server, which could be accessed by any of the aforementioned via the internet in the event a financial code 202 needs to be located to identify a product or service or other information.

At 514, the FCs 202 can be used at any type of POS 205 represent processes and information originating from the POS 205 such as, but not limited to, date, time, store identity, price, sub-total, taxes and total. FCs 202 can also be used to identify exchanges and returns so that they can be automatically processed by the FPS 208.

Internet, telephone, utilities, automatic and invoiced billings related to POSs 205 or methods of billing and payment can use the FCs 202 to identify information as the methods of their businesses require. The aforementioned could use printed or electronic transaction barcodes 204 as effective methods of storing and delivering the financial codes 202 and associated data, via receipt, email or internet. The recipient could then scan the receipts with a scanner or OCR (optical character recognition). Keyed or human entry 106 of data and FCs 202 into the FPS 208 is also possible.

At 515, Non-POS 206 computers, mobile devices and other associated devices can have software or applications installed capable of associating their specialized data with the FCs 202 and then formatting the data in a manner that is acceptable to being processed by the FPS Non-POS 206 entities can utilize any existing or new hardware such as optical and magnetic scanners, computers, servers, printers and any of means of data transmission to facilitate the invention.

516 shows how the POS 205 extracts the FCs 202 and combines the data identified by the FCs 202.

At 517, the POS 205, Non-POSs 206 or other locations or electronic devices can extract the FCs 202 using machine or human readable methods including but not limited to, optically, magnetically, visually or physically. The FCs 202 can be identified, extracted or retrieved from the devices in which the FCs 202 are stored including the product identifier 203, TCDs 207, POS 205 remote servers, the cloud, mobile devices, wireless devices, the FPS 208 and other devices capable of storing to the FCs 202 to memory to improve the functionality of the invention.

At 518, FCs 202 can be used to identify the product data from a product identifier 203, the receipt or sales data 104 on a purchase and the data from the TCD 207. The POS 205, Non-POS 206 then combines the FCs 202 and associated data from the product identifier 203, POS 205 data, 104 and the TCD 207 to create transaction data 308. The transaction data 308 now contains all the information identified by the FCs 202 for the FPS 208 to process the transaction or purchase at the POS 205

At 519, the transaction data 308 or other information identified by the FCs 202 is transmitted via the internet, telephone, satellite and or other wireless methods such as but not limited to Bluetooth and nearfield communication.

At 520, the FPS 208 receives the data being transmitted from POS 205 and Non-POS 206 sources.

At 521, the POS 205 data or Non-POS 206 data is received by the FPS 208 for processing or storage depending on the type of data. There are three basic types of data being inputted into the FPS 208 from different sources. 1. Transaction data 308 that has virtually every item identified by a financial code. 2. Specialized data such as banking, accounting, payroll, et cetera which has already been processed and identified with FCs 202. 3. Bulk data that will not be parsed or processed. Bulk data only needs the necessary data to transmit and store the data identified by FCs 202.

At 522, the FPS 208 utilizes the FCSs 202 as instructions to parse the transaction data 308 so it can be processed into a financial report 313. The specialized data being derived from Non-POS 206 sources can be identified with FCs 202 so it can be stored separately or parsed and merged with other data or financial report 313s.

At 523, all the data that has been processed by the FPS 208 is stored in memory for later access.

At 524, the user accesses the FPS 208, 424.

At 525, the user can use a template designed for their specialized needs that condenses or manipulates the financial codes 202 and associated information automatically.

At 526, the user can custom edit the FCs 202 for further customizing the FPS 208. The user also can create a data routing system within the FPS 208 using the FCs 202.

At 527, the user accesses their financial report 313 or other data from their own computer via the internet or other electronic methods or can pick up their financial report 313 or other data at the company managing the FPS 208. If the user manages their own FPS 208 then the financial report 313 and other information will be on their own computer.

Figure 6:
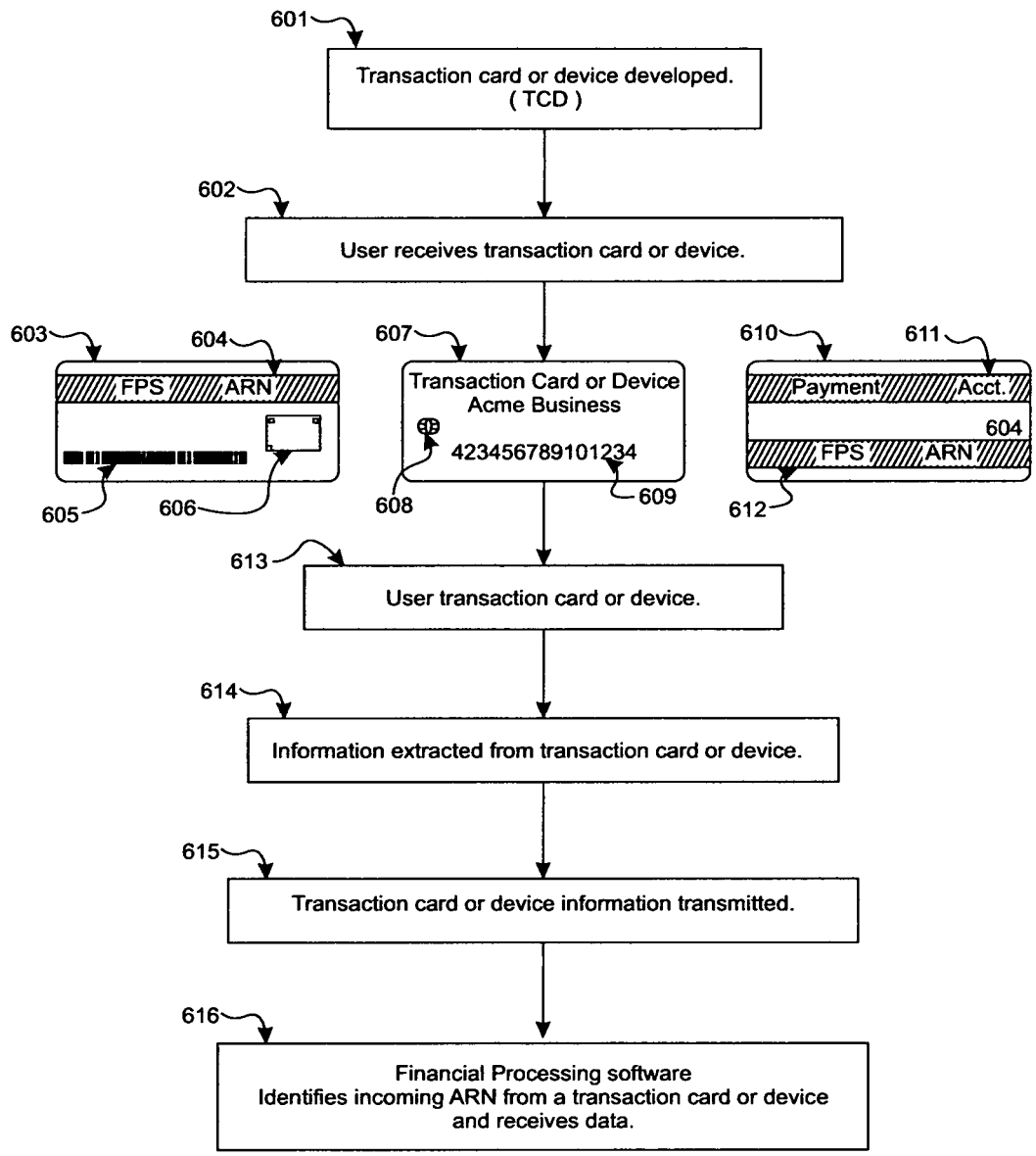
FIG. 6 illustrates a flow chart on how the transaction card or device (TCD) is used and functions in accordance with at least one embodiment of the claimed subject matter.

Further embodiments at FIG. 6 include a flow chart on how the transaction card 207 is used and functions.

At 601, is the transaction card or device (TCD) 207. The TCD 207 is any device that can be machine or human encodable and/or readable that physically, electronically, or magnetically stores the user's FPS 208 account number, routing number or email address (ARN 209). When the FPS's 208 ARN 209 is extracted from the TCD 207 by the POS 205 or other entity, the FPS's 208 ARN 209 is used by the POS 205 or other entities to access the FPS, 208 so that data from the POS 205, Non-POS 206 or other locations can be transmitted to the FPS 208.

The TCD 207 can be made in any one dimensional, two dimensional or three dimensional shape that has the ability to be encoded, store and convey information including but not limited to cards, digital wallets, purses, jewelry, phones, rings, watches, bracelets, eye wear, pens, pointers and electronic chips. The TCD 207 could be made of any material or substance. The TCD 207 can be made to have a scannable magnetic strip, barcode, QR code, chip or other device that allows information to be stored and extracted by any machine or human readable methods. The TCD 207 could be designed to function with wireless communication processes such as but not limited to, near field communication, RFID and Bluetooth. The TCD 207 can utilize the same methods and devices that credit and debit cards currently use including the chip or the new methods. Mobile phones and wireless devices can have applications designed to act as a TCD 207 by retrieving the FPS's 208 ARN 209 and other information from memory.

The FPS's 208 ARN 209 embedded in the TCD 207 can conform to existing methods of identifying accounts or use a new method of account identification.

The TCD 207 could have a singular address or ARN, 209 or a plurality of addresses and ARNs that are scannable and or extractable at the POS 205, Non-POS or other electronic interfaces.

At 602, the user receives the TCD 207, or an electronic application for a mobile phone or other wireless device, from whoever is managing the account so the user's FPS 208 can be accessed from the POS 205, mobile device or other computer interface. It is possible that the user can manage their own account and these devices could be ordered or purchased at the same time the user purchases the FPS 208.

The TCD 207 can be made to contain additional information on, but not limited to, the card holder, employee information, job, vehicle information, language and other information, with this information being identifiable with FCs 202 and machine or human extractable.

The TCD 207 can be encoded and used as a vehicle containing the user's payment account information such as but not limited to credit and debit cards, in addition to accounts receptive to receiving transaction data 308 only or any combination thereof. The TCD 207 could also be used when Non-POS 205 data is transmitted to the FPS 208. The TCD 207 can be scanned or used at any time during the transaction process to improve its functionality at the POS 205

603, shows one possible rear face of a TCD 207 containing the FPS's 208 account or routing number (ARN 209) in a magnetic strip 604, barcode 606, or QR code 606.

At 607 is a possible front face of a TCD 207 with an electronic chip 608 and a human readable ARN 209 at 609.

At 610 is another version of a rear face that shows the addition of a payment account 611 in a magnetic strip with the FPS's 208 ARN 209 in another magnetic strip 612 below.

At 613, the user purchases a product or products at the POS 205. The user uses any form of payment they wish at the POS 205, because the TCD 207 is not a payment card. However, a payment card or method can be incorporated into the TCD 207 as seen at 611. The TCD 207 not being a payment card allows the invention to expand to others areas not associated with a POS 205 and a purchase.

At 614, the FPS's 208 ARN, 209 and other data are extracted from the TCD 207 by the POS 205 or other entity so that the data extracted from the TCD 207 can be combined with other data and then use the FPS's 208 ARN 209 to establish a valid ARN 209. An application or program can be made so that mobile phones, and other mobile and wireless devices can be used to extract the FPS's 208 ARN 209 and other data that would be stored on the TCD 207. Mobile apps and with templates allow the TCD 207 to be used for service contracts and other location where there is no hard wired POS 205. The TCD 207 can be encoded with additional address or accounts so that the TCD 207 can be used to transmit data, receipts and transaction data to locations other than the FPS 208.

At 615, after receiving notification of a valid ARN 209 back from the FPS, 208 the POS 205 or other entity transmits the transaction data 308 or other data to the user's FPS 208 account.

At 616, the FPS 208 identifies the incoming ARN 209 originating from the TCD 207, being transmitted from the POS 205 other entities and allows the transaction data 308 and other data to be transmitted and received by the FPS 208. The data from the TCD 207 is then processed by the FPS 208 to be used to identify the person initiating the transmission of data on a purchase or other data source.

Figure 7:
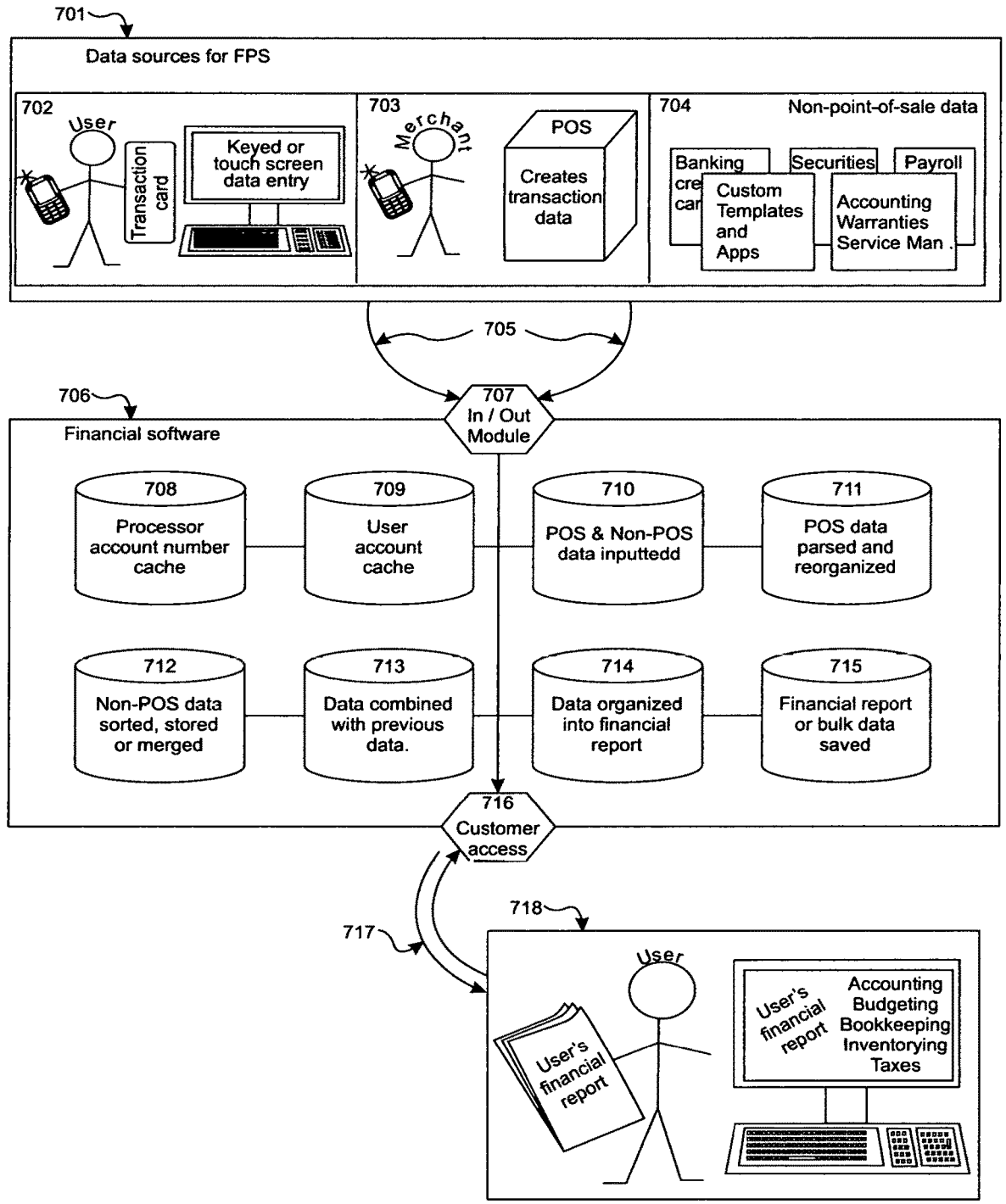
FIG. 7 illustrates a diagram of how the financial processing and data management software (FPS) and system functions in accordance with at least one embodiment of the claimed subject matter.

Further embodiments at FIG. 7 include a diagram of how the financial and data processing software or system functions 208 (FPS).

At 701, is the types and sources of data that the FPS 208 is capable of receiving for input to be processed into a financial report 313 or stored for future reference.

At 702, the user enters keyed or human entered data 106 from their office, home computer or a remote location. Allowing the user to enter data not entered automatically from the POS 205 or Non-POS 206 locations. The user can also edit data and the FCs 202 so that purchases can be categorized, organized and/or reconciled or any combination thereof according to the needs of the user. The entry of data at this level could be accomplished by keyed entry, scanning of transaction barcodes 204, OCR or the manipulation of e-mails or other methods necessary to enter data that was not automatically entered into the FPS 208.

703 represents POSs 205 that combine data from the POS 205 and peripheral devices, the product identifier, the TCD 207 or other devices or any combination thereof. The following is a list of some of the types of POSs 205 and devices that can participate in the invention, wholesale and retail locations, brick and mortar locations, internet sites and stores, mobile phones, wireless devices, catalog sales, telephone sales, services, utilities, invoicing methods, automatic billing systems, payment systems, securities transactions, contracts and financial agreements, credit and debit card systems and other methods, devices or businesses that can be incorporated into the invention. All of the data related to the aforementioned can be identified with a FC and processed by the FPS 208. The entities associated with the aforementioned types of transactions can have customized templates and software designed to their specific needs to facilitate the input of data and to quickly transmit the data to the FPS 704 represents the input of data into the FPS 208 that is not related to the POS 205 purchases, such data is referred to as Non-point-of-sale 206 (Non-POS) data. Businesses, methods and devices that can be considered Non-POS 206 could be, but not limited to, banking data, credit card data, payroll data, financial portfolios, inventorying, accounting and bookkeeping data, wire transfers, warranties, service manuals, instructions, et cetera. All of the data contained in the aforementioned can be identified with a FC 202 and transmitted to and processed by the FPS 208. The entities associated with the aforementioned data types can have customized templates and software designed to their specific needs to facilitate the input of data and to quickly transmit the data to the FPS 208.

At 705 the data from POS 205 Non-POS 206 sources is transmitted or entered into the FPS 208 by means of the internet, phone, wireless or any other methods that may be used to transmit data. The FPS's 208 ARN 209 can be extracted from the TCD 207 electronically or visibly and inputted into the FPS 208 so the ARN 209 can be identified as valid or invalid. After the ARN 209 has been verified by the FPS 208, the data from the sources represented in 702-704 can be transmitted and inputted into the FPS 208.

The method of data transmission between the POS 205 and the FPS 208 could incorporate or use existing methods of transmitting credit and debit card data or use a modified system bypassing the money management processes of the current credit and debit card systems. The TCD 207 not being a payment card and the FPS 208 not being in the position of having to manage money could allow the TCD 207 to use a new method or system of transmitting and routing of data between the POS 205 and Non-POS 206 locations and the FPS 208 eliminating the processes involved with money management. In addition, the amount of data the invention processes especially from Non-POS 206 transactions may not be compatible with existing systems. (See FIG. 8) The transmission of data by email would use existing methods of sending email.

706 is the FPS's 208 computer hardware and software that is used to store, parse and organize POS 205 transaction data 308 into an accounting, bookkeeping, budgeting, inventorying or tax preparation format or any combination thereof. The FPS 208 can have customized templates for the user to choose from to customize the FPS 208 to their needs. The user can also edit and manipulate data and the FCs 202 to complete any specialized functions relating to their personal or business needs. The FPS 208 can identify and work with different sets of FCs 202 used by different types of product identifiers 203 and entities and combine the different sets of FCs 202 into a uniform format that the FPS 208 can process accordingly. The processes of 706-716, are not necessarily in a specific order, due to the ability of data from different sources to be entered at different times and the user always being able to edit data.

707 is an In/Out module that identifies the FPS's 208 ARN 209 that is transmitted from any of the sources mentioned in 702-704. The in/out module 707 accesses a cache memory of ARNs 209 at 708 and identifies the ARN 209 as valid, and allows the transmission of data to be inputted into the FPS 208. If the ARN 209 is invalid, then the location transmitting the data will be notified that the ARN 209 is invalid and the transmission will end. A user managing their own account may be limited to E-mail access of the account due to the computer or server hosting the FPS 208 being turned on and off. A financial entity specializing in FPS 208 hosting would be able to function and be accessible by the POS 205 and Non-POS 206 user 24 hours a day.

At 708, the user's FPS 208 ARN 209 is identified from a cache memory 708 of other account numbers stored in the FPS's 208 memory 708. If the user manages their own account there would only be one ARN 209 or email address to be identified.

At 709, the user's financial data stored in the FPSs memory is accessed for the purpose of adding additional information comprised of the transaction data 308 from the merchant's or entities mentioned in 702-704.

At 710, the FPS 208 receives the POS 205 data from 702-704 with the FCs 202 and associated information. Non-POS data 206 assigned a financial code 202, or in this instance, a routing code 712 may be a better name, so that when the data is transmitted, it is automatically stored to separate files. Transaction data 308 from POSs 205 can be inputted directly into a processing file at 711. Data can also be directly entered into the user's financial template.

At 711, the transaction data 308 with the FCs 202 is parsed and reorganized, categorized and or reconciled and put into an organizational structure to be formatted. The FPS 208 identifies any transaction data 308 having no FCs 202. Data with no FCs 202 is entered into a separate or miscellaneous file and processed accordingly or to be reconfigured by the user.

At 712, the FPS 208 allows the input of data from Non-POS 206 sources, such as but not limited to banking, credit card companies, payroll, inventory, or other financial accounting or business and product information such as but not limited to warranties, service manuals instructions, et cetera. This data can be identified by a FC 202 or routing code 712, in addition to the FCs 202 and be manipulated automatically by the FPS 208 or manually by the user. Non-POS 206 data can be identified and stored separately into individual files by the FPS 208 using the FC 202 routing number 712. If the Non-POS 206 data is to be merged with POS 205 data or other data, the Non-POS 206 data identified by FCs 202 can be parsed and merged with other data by the FPS 208.

At 713, the data entered and processed by the POS 205 is combined or merged with data and information from the past. This allows the FPS 208 to make continuous financial reports 313 on a weekly, monthly or yearly basis. It also allows the FPS 208 to identify and process refund and exchange transactions being transmitted from the POS 205. Functions such as depreciation, amortization or interest requiring processing over time can also be processed.

At 714, the combined data is formatted to produce an updated financial report 313 of the users choosing. If the user wants to edit data, they have full access to the FPS 208 functions if necessary. If the user is using a template and the FPS 208 is pre-setup, then the user may have little or no interaction with the software processing POS 205 other data.

At 715, the FPS 208 stores any financial reports 313 to memory for future access, so the user can access the financial report 313 for the purpose of, editing, printing or whatever the user's needs may be. Non-POS 206 data is stored in a format that the user can retrieve if necessary.

At 716, is the user accessing the FPS 208 account from a user interface.

At 717, the user can access the FPS 208 via the internet or remote locations, mobile phones, wireless devices or personal interfaces and the entity managing the FPS 208 account. The user can access the FPS 208 at any time to edit or make changes to how the FPS 208 is processing data. The user can also locate and manipulate individual data entries if necessary. A financial report 313 can be printed, emailed or mailed to the user or picked up at a brick and mortar building at any time of the user's choosing.

At 718, the user receives the financial report 313 that has all their purchases organized in a manner that they can use for bookkeeping, accounting, budgeting, inventorying or tax purposes or any combination thereof, or other reports designed to the user's preferences.

Figure 8:
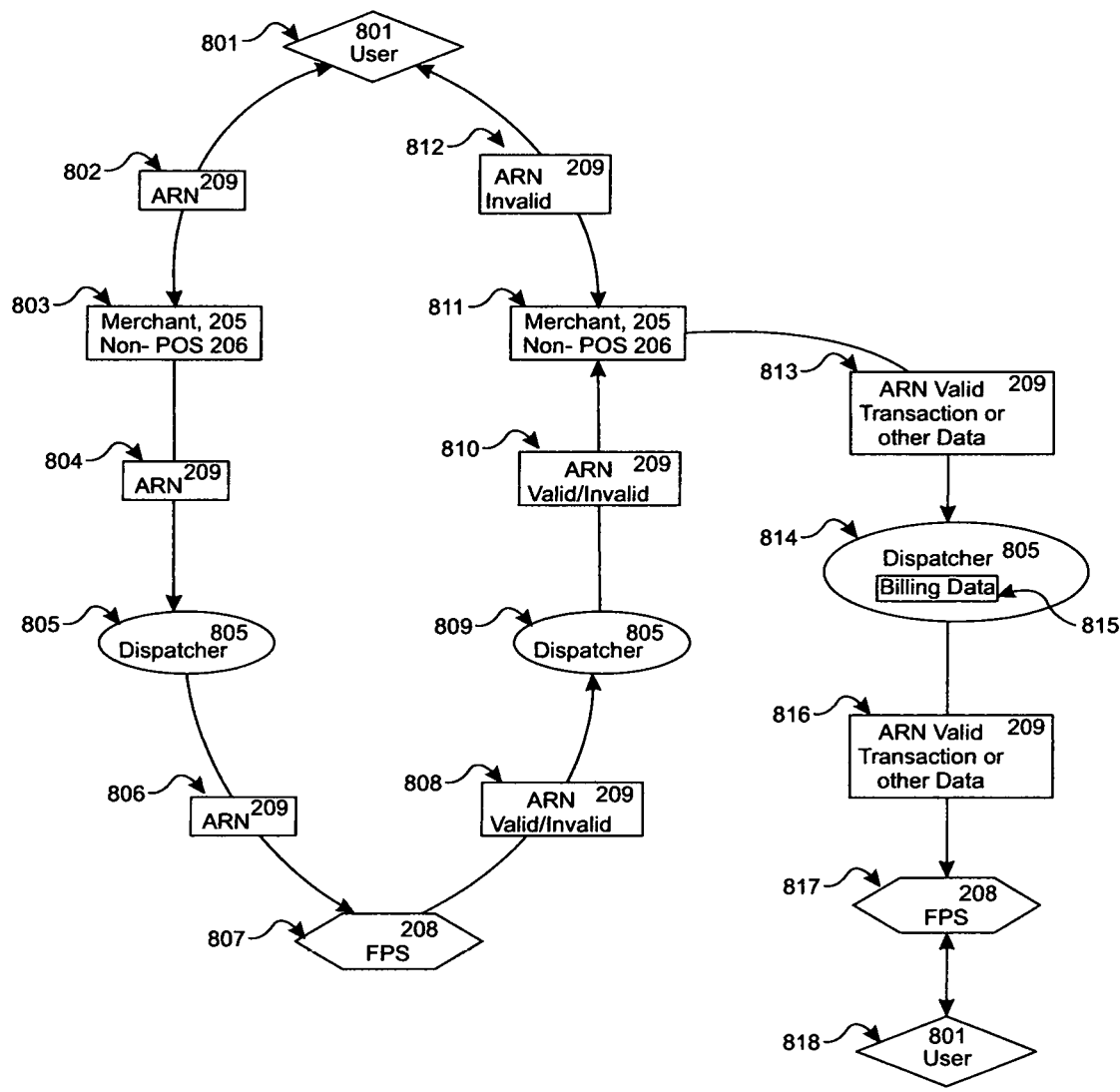
FIG. 8 illustrates a flow chart of one method for the transmission of data between the POS 205 and Non-POS and the FPS in accordance with at least one embodiment of the claimed subject matter.

Further embodiments at FIG. 8 include a flow chart of one method for the transmission of data between the POS 205 and Non-POS 206 and the FPS 208. For this example, the POS 205 and Non-POS 206 will be referred to as the merchant 803. This should not be considered the only method for the transmission of data between the merchant 803 and the FPS 208, as similar methods or existing methods may be used. Since the invention does not require a payment to be made, the money management steps involved in credit and debit card processing are not necessary. A middle man or dispatcher 805 manages the processing of the data. The dispatcher 805 is also in a position to process any billings 815 for the invention.

At 801, the user 801 purchases a product or service at a merchant 803 or other location.

At 802, the user 801 provides the merchant 803 with the ARN 209.

At 803, the merchant 803 receives the ARN 209 from the user 801. The merchant 803 then transmits the ARN 209 to the dispatcher at 805.

At 804, the ARN 209 is being transmitted from the merchant 803 to the dispatcher 805.

At 805, is the dispatcher 805 receiving the ARN 209 from the merchant 803 at 803 and then transmitting it on to the FPS 208 at 807. The dispatcher 805 can be any software, hardware or entity capable of receiving, processing and transmitting and managing the ARN 209 and any data associated with the ARN 209.

At 806, the ARN 209 is being transmitted from the dispatcher 805 at 805 to the FPS 208 at 807.

At 807, the FPS 208 receives the ARN 209 and validates the ARN 209 as being valid or invalid. After the ARN 209 has been determined to be valid or invalid, the results are transmitted back to the dispatcher 805 at 809.

At 808, is the transmission of the valid or invalid ARN 209 from the FPS 208 at 807 to the dispatcher 805 at 809.

At 809, is the dispatcher 805 receiving the valid or invalid ARN 209 from the FPS 208 at After receiving the valid or invalid ARN 209 the dispatcher 805 then transmits the valid or invalid ARN 209 back to the merchant 803 at 811.

At 810, is the valid or invalid ARN being transmitted between the dispatcher 805 at 809 and the merchant 803 at 811.

At 811, is the merchant 803 receiving the valid or invalid ARN 209 from the dispatcher 805 at 809. The merchant 803 then processes the valid or invalid ARN 209 accordingly. If the ARN 209 is invalid, the merchant 803 will inform the user 801 at 801 of the invalid ARN 209 and the process is ended. If the ARN 209 is valid the merchant 803 will then transmit the transaction data 308 or other data on the user's 801 purchase or transaction to the dispatcher 805 at 814.

At 812, is the user 801 being notified that the ARN is invalid and the data was not processed.

At 813, is the transmission of transaction data 308 or other data between the merchant 803 at 811 and the dispatcher 805 at 814, as a result of the ARN 209 being valid.

At 814, is the dispatcher 805 receiving the transaction or other data 813 from the merchant 803 at 811. The dispatcher 805 at 814 identifies the data identifying the transaction or other data 813 and stores it to memory so that this data can be used for billing 815 purposes. After the transaction or other data 813 has been processed for billing 815 purposes, the dispatcher 805 transmits the transaction or other data 813 to the FPS 807 at 817.

At 815, is the billing data 815 stored to the dispatcher's 805 memory, for the purpose of billing the merchant 803, the FPS 807 or the data can be supplied to a third party to manage the billing.

At 816, is the transmission of transaction or other data 813 from the dispatcher 805 at 814 to the FPS 807 at 817.

At 817, is the FPS 807 receiving the transaction or other data 813 from the dispatcher 805 at 814.

At 818, the user 801 accesses their financial report 313 from the FPS 807 at 817.

Further embodiments in FIG. 9 include two hypothetical receipts from a POS 205 and a transaction card with references to FIGS. 4,5 and 6

901 is an embodiment of a receipt inputted into the FPS 208 before it is parsed and reorganized by the FPS 208. The POS 205 extracted the necessary FCs 202 and other information from the product identifier 203 and the TCD 207.

At 902, is the store name, it has a FC of 001. In this example, all FCs 202 used to identify POS 205 data or functions use the numbers 001-019. This illustrates how the FCs 202 can be grouped to improve functionality. The store name Acme Hardware is data, and must be in digital form for processing. 903, is the transaction number and type of transaction, which is important for the FPS 208 and the POS 205 to process returns, exchanges and perform other cross-indexing when necessary, the transaction number is identified by a FC 202 of 004. The transaction type is sales.

904 is the date and time and have the FCs 202 of 002 and 003.

905 is a column of names for the items purchased. Item names are usually in abbreviated format sometimes difficult to decipher. Current product identifiers 203 often identify products by manufacturer 401 and product name in addition to numerous other types of data and information. Abbreviated names become problematic when companies are going in and out of business on a daily basis and then adding new products. There is also the problem of similar names such as tape, tape measure and cassette tape. It creates a situation where the FPS 208 would have to be updated on a daily basis to keep track of the changes. Attaching a FC 208 to the product identifier 203 won't decipher the name, but it will allow the product to be grouped into a category and machine manipulated automatically. The FPS 208 can also be designed to manipulate data by the item name 905 if necessary.

906 is a column listing of the FCs 202 associated with each product purchased in column 905. The FCs 202 themselves would be buried in computer code and most likely not be visible when actually viewing data. However, the FPS 208 can allow the FCs 202 to be visible if necessary, so the user can edit any FCs 202 if necessary. The FCs 202 being embedded or associated with the product identifier 203 allows for the entire process of accounting and bookkeeping to become automated.

907 is column listing of the actual names of the FC 202 categories. The FC 202 category is directly related to the FC 202. The FPS 208 also give the option of viewing the FC 202 or the FC 202 category.

Note that items 4, 5, and 11 in column 905 are categorized as fasteners in column 906 even though they are completely different. They do all have the same function of connecting things together.

Note item 10 and 11 both are called tape however, item 10 clear tape is usually used in an office environment. Since most businesses want to know the cost of their office supplies and the manufacturer 401 knows this, the manufacturer 401 affixed the FC 202 of 425, which represents office supplies to the clear tape. This distinguishes the two types of tape into different categories, which are office supplies and fasteners. The tape measure at 911 purchased at ABC hardware 911 (lower right) has a FC 202 of tools. This also shows the problem of processing information by the item name only. The insertion or association of the FCs 202 into or with a product identifier 203 solves this problem and there is no need to constantly update the software trying to keep up with the constant changes in the product identifier 203. Items 6 and 7 are also in the office supply category of 425. Items 1, 8 and 14, are all in a tools category. They have the codes of 111 tools, 119 electric tools and 122 commercial tools.

Item 14 is highlighted in bold, a chain saw costing $895.00. The FC 202 of 122D07I when broken up represents 3 things, 122 is the FC 202 category 907 of commercial tools, the "D" represents the function of depreciation, the 07 represents the number of years to depreciate the chain saw. The "I" represents information. The manufacturer 401 knows this because on the warranty cards returned, is the question. "How many years do you intend to depreciate this chain saw?" Most of their customers responded 7 years. However, this is not exact "most of their customers" means some were depreciating the chain saw for a different length of time. This is why this item is highlighted in bold "further attention may be necessary" if the user wants to make a change. Although the computer only needs the letter "D", people on the other tend to miss minute details so the computer highlights it in some manner for you. If the user is satisfied with depreciating the chain saw for 7 years and does nothing, and makes no edits to the chain saw, the FPS 208 will process the chain saw as a business depreciation expense for 7 years. This would be done automatically with no human interaction. If a paper receipt is printed and the FC 202 of 122D07 is visible, then the user only needs to glance at their receipt to see if a change is necessary. The software can also be programed to notify the user in other ways.

908 is a column listing the price of each item. The price of each item is usually a function of the POS 205 involving the data between the product identifier 203, and what the merchant wants to charge. Sub-total, sales tax and total, represent POS 205 functions as their FCs 202 are all between 001 and 019.

909 shows the method of payment. 6752 is the check number.

910 is the data stored on the TCD 207. For this example TCD 207 FCs 202 are between 020 and 029. 021 is the company name, 022 is the employee ID, and 023 is the vehicle ID and 024 is the card holder's language.

911 is basic receipt information from ABC Hardware 902. Tape measure has a FC 202 of 111 indicating tools, garden hose has a FC 202 of 365 indicating garden supplies and the oil and oil filter have a FC 202 of 512 indicating automotive. These will be used in FIG. 10 along with the other transaction data 308 above.

Figure 10:
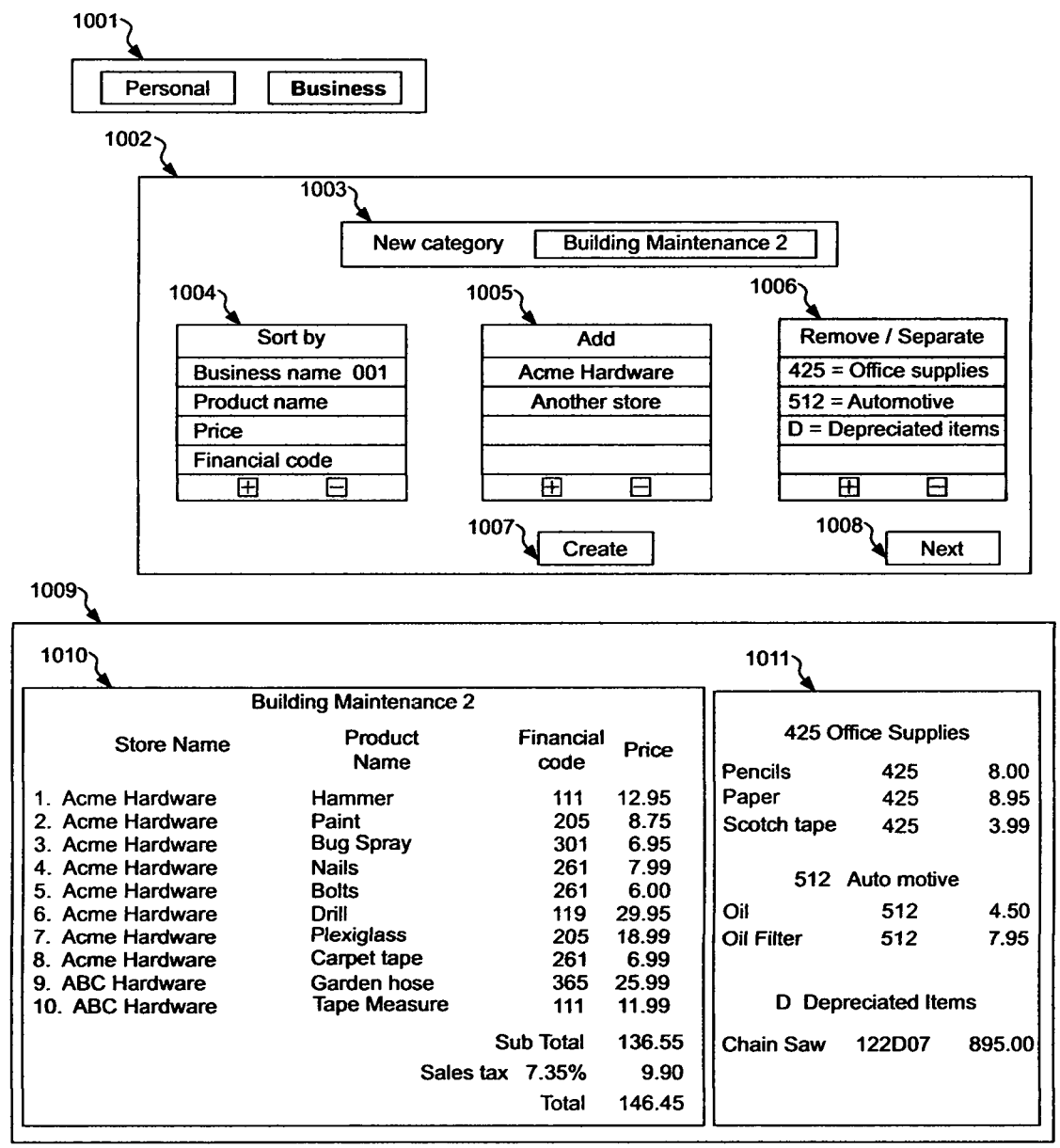
FIG. 10 shows further embodiments of the invention involving the manipulation of financial codes.

FIG. 10 shows further embodiments of the invention involving the manipulation of financial codes 202. With reference to FIG. 9.

At 1001, is a button identifying whether the user is using the FPS 208 for business or personal. In this example, the user is using the FPS 208 for business use so business functions such as depreciation are turned on.

At 1002, is a software program box designed to create a new category using the FCs 202. Since there are numerous product and service categories, it is necessary to consolidate the categories. Most businesses have a handful of categories, which are almost universal in nature, such as, office supplies, automotive, building maintenance, communications, advertising et cetera. In FIG. 10, a new category at 1003 is being created. The business owner or user knows they buy almost all their building maintenance supplies from two stores Acme Hardware 902 and ABC Hardware 911. At 1002, the business owner or user adds a new category, at 1003 called building maintenance 2. The owner will sort the digital receipts at 1004 by business name or the FC 202 of 001 at 902. At 1005 the business owner adds two stores to be in the building maintenance 2 category, Acme Hardware 902 and ABC Hardware 911. If the business owner stops here, everything purchased at these two stores would be placed in the building maintenance 2 category 1003, however, the business owner does not want this. They know that other products are purchased at these two stores that fall into other categories, which are office supplies, automotive supplies and expensive tools that can be depreciated. The business owner opens the remove separate window 1006 and adds office supplies with a FC 202 of 425, automotive with a FC 202 of 512 and depreciated items with a FC 202 of "D". These 3 items listed in 1006 will be separated out from purchases made at these two stores.

At 1003, is a box where the new category name will be inserted.

At 1004, is a list of ways the data can be sorted. Each method is identified by a FC 202. In this instance, business name is selected to be the first method of sorting and product name is the second method of sorting, price is the third method and financial code 202 is the fourth method listed.

At 1005, is where the name of the business or businesses are entered. In this instance, the names of the businesses are Acme Hardware 902 and ABC Hardware 911 both identifiable by the FC 202 of 001. At 1006, is the further separation of the data using the FCs 202 by the category that was assigned by the manufacturer 401 and inserted into the product identifier 203. In this instance, the user does not want any items being purchased that have the FCs 202 (FIGS. 906 & 911) of 425 office supplies, 512 automotive or "D" for items that are more expensive and can be depreciated. These items will remain in their original categories (FIG. 906, 907, 911) as depicted by their FCs 202.

At 1007, if the user is satisfied the user can click on create to create the new category 1003.

At 1008, if the user wants to separate the new category 1003 down further, they can click on next and a similar window will come up.

At 1009, the transaction data 308 and digital receipts (901 & 911) from POS 205 have been parsed and put into separate categories. In these examples, only the item name, FC 202 and price are showing. In actuality date, time, transaction number, store employee ID and other information could all be added.

At 1010, is the new category building maintenance 2 from 1003. All the items from these two stores will automatically be put in this category with the exception of items that are purchased with the FCs 202 of 425 representing office supplies, 512 representing automotive and a "D" for depreciation. Items 1-8 are products purchased from Acme Hardware 902 and items 9 and 10 are both products purchased from ABC Hardware 911.

At 1011, is a list of the items separated out from the new category 1003 "Building maintenance 2" 1003. The three categories separated out 1006, office supplies, automotive and depreciation. 425 is the category for office supplies, 512 is the category for automotive and were purchased at ABC Hardware 911. "D" is the category for depreciation 906, item 14.

The unique part of this invention is the origination point of the identifying data, "the FCs 202, were inserted or associated with the product identifier 203 and then transmitted and inputted into the FPS 208, not by the user of the FPS 208, but by the manufacturer 401 or other entity that has no relationship with the user of the FPS 208. This allows the FPS 208 to become completely automatic once the FPS 202 is set up. If the user is using a customized template the user may not have to do anything what so ever except swipe their TCD 207 and pick up their financial report 313 at the end of the quarter.

Further embodiments in FIG. 11 include a method to reduce the number of FCs 202 categories 907 down to the specific categories a business uses. With reference to FIG. 9.

At 1101, is a FPS 208 window designed to manipulate or combine FCs 202. The user wants to reduce the number of categories 907 so they are more manageable. This could be done with a template of the user's choosing or the user can do it individually. A template would also include the consolidation and organization of other data and processes.

At 1102, is a data entry box asking which stores the user wants to include in the consolidation of financial codes 202. The user chooses all stores.

At 1103, is a data entry box asking for the FCs 202 the user wants to consolidate. The user types in the FCs 202 of 401-435. The code for office supplies is "425" from 911. These codes are all in the same proximity as office supplies indicating they are closely related to office supplies in some manner.

At 1104, is a data entry box asking if the user wants to edit out any products in the FCs 202 typed in box 1103. The user selects "all" so all the products purchased in the FCs 202 listed in box 1103 will be affected. If the user had selected edit 1104 then a second window would have opened, allowing the user to edit out specific products by using the product names derived from the product identifier 203.

At 1105, is a data entry window for entering the FC 202, of which the FCs 202 listed in 1103 will be combined into. The user has entered the FC 202 of 425, which is office supplies 906 907. Note in 1103 all the FCs 202 are listed in a numerical range that is close to office supplies, meaning that these FC 202 categories are closely related to products that may be used in an office, such as art supplies, office chairs et cetera.

When the button at 1106 is clicked the changes will be made so that from now on any product purchased at any store that has one of the FCs 202 between 401-435 listed in 1103 will be automatically parsed and categorized with a FC 202 of 425 so that the products will appear in office supplies. It will make no difference what the other items on the receipt are. The receipt will be parsed automatically by the FPS 208 according to the FCs 202 extracted from or associated with the product identifier 203 at the POS 205 The user can do the same thing by using a template that is set up for their individual business needs. However, if some micromanaging of the FPS 208 is necessary this shows how embedding or associating the FCs 202 in or with the product identifier 203 can allow the products to be automatically categorized so that the product data when purchased will be automatically parsed, reorganized accordingly and or reconciled into a financial report 313 of the user's preference.

FIG. 12 shows further embodiments describing inserting a FC 202 representing a function into or associating with the product identifier 203. This can allow the FPS 208 to process functions. With reference to FIG. 9. The function used is that of depreciation. The description starts with the FC 202 already being extracted from the product identifier 203, processed and transmitted to the FPS 208 by the POS 205

At 1201, is a FPS 208 window for data entry that is for processing the function of depreciation. The FPS 208 has already parsed the receipt in FIG. 9 and has identified the FC 202 of 122D07I as being associated with the chain saw purchased at Acme Hardware 902 (see 905-908). The FC-122D07 is broken down as follows by the FPS 208, 122 represents the category commercial tools, "D" represents the function of depreciation and 07 represents the number of years the manufacture has suggested the chain saw be depreciated for. The question arises as to how the manufacture knows this.

1. The chain saw is more expensive than what the average consumer would purchase, so it will likely be purchased by a business that will be depreciating it.
2. The manufacturer's 401 return warranty and registration card can ask the question. How many years do you intend to depreciate this item. Then take an average on the warranty cards returned.
3. The manufacture already knows the functional life of the equipment being sold.
4. To some degree, most items that perform some type of function can be purchased by a business and be depreciated. So adding the code "D" for depreciation would be common so the button at 1001 would allow the functions to be turned on or off depending on whether the FPS 208 will be used for business or personal.
5. The manufacture knows that the user has the ability to edit the number of years depreciated so the manufactures input is only a suggestion. The function of depreciation is flexible in that the user can change the number of years an item is depreciated. Other functions do not provide such flexibility such as amortization, sales tax and others.

At 1202, is a data input window showing that the manufacturer 401 suggested time period for depreciating the chain saw, which is identified as seven years in the top box. The data in box 1202 is highlighted in some manner so that the user can quickly identify the manufacturer 401 suggested depreciation period. If the user does nothing, the FPS 208 will automatically depreciate the chain saw for 7 years. If the user wishes to change the number of years the chain saw is depreciated for, the FPS 208 gives the user other options as in 1203 and 1204.

At 1203, is the option for depreciating the chain saw for 5 years. If the user wants to make a change and depreciate the chain saw for 5 years then the user would simply click the top button that says five years and the change would be made after the user clicks enter at 1205.

At 1204, is the option for depreciating the chain saw for 3 years. 1204 also shows the option of adjusting the years with up and down arrows to the right of the 3 years box.

At 1205, when the button at 1205 is clicked the selection takes effect. The chain saw can now be entered into a financial report 313 of the user's choosing.

Figure 13:
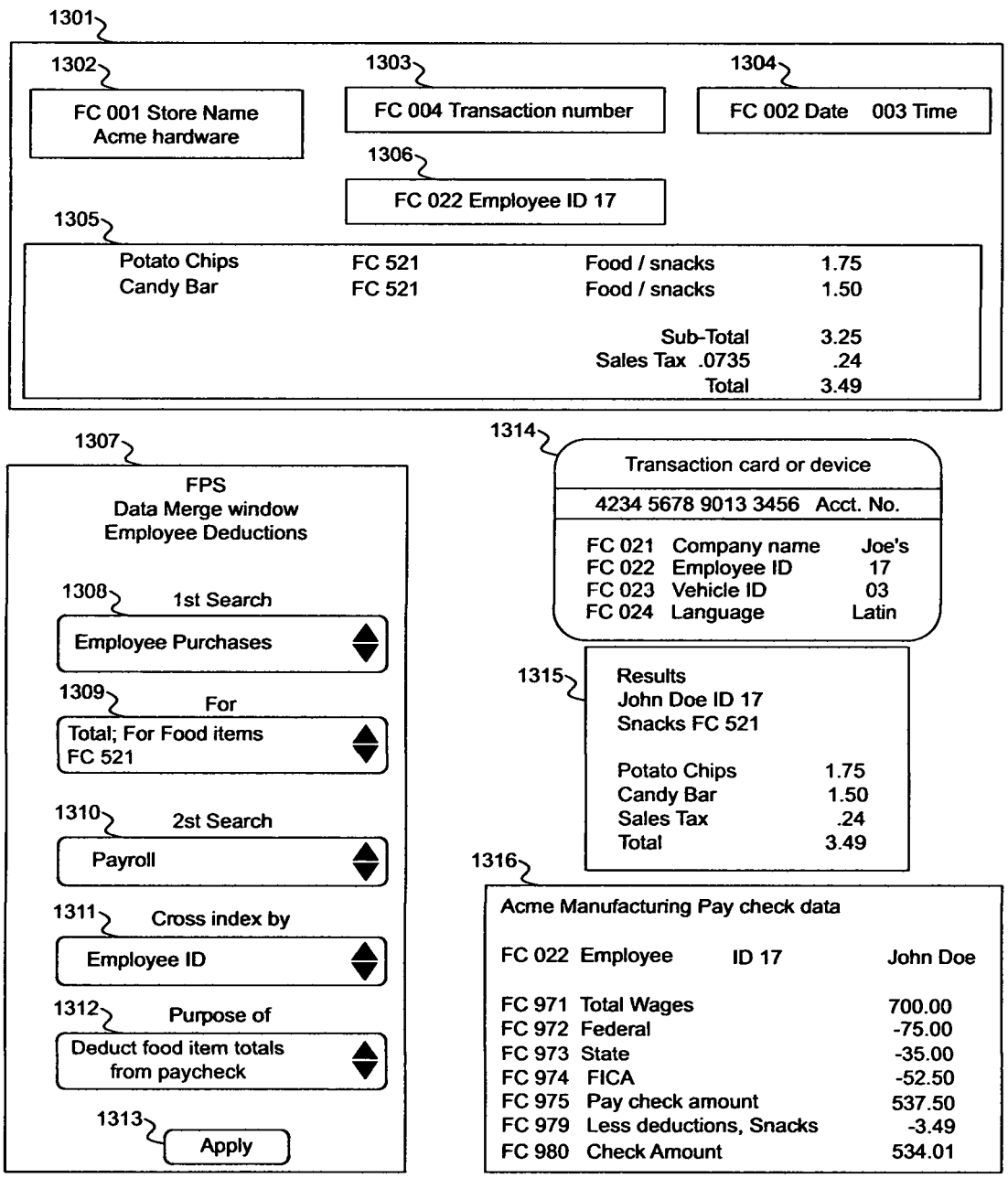
FIG. 13 is a description showing further embodiments of how POS data and Non-POS data can be merged to accomplish a task with no human intervention after setting up the FPS

FIG. 13 is a description showing further embodiments of how POS 205 data and Non-POS 206 data can be merged to accomplish a task with no human intervention after setting up the FPS 208. Only data that is needed for the illustration is shown.

At 1301, is basic sales data 104 from a store in which an employee using a transaction card or device 207 purchases some food items or snacks. The data is recorded and the employee uses a TCD 207 to record the transaction.

At 1301, is the basic data on the transaction, 1302 is the name of the store, 1303 is the transaction number, 1304 is the date and time, 1305 is the items purchased, and 1306 is the employee ID. At 1305, is the items purchased which is two food items or snacks with a financial code 202 of 521. The total price was $3.49. The employer wants to be able to automatically identify when one of the employees purchases non-business items so that it can be deducted from the employees paycheck at 1316 automatically.

At 1307, the employer or user opens a window in the FPS 208 for searching what employees are buying. At 1308, is a search window where the employer can do a search of all the transaction data 308 looking for food items that were bought and the employer paid for. The pull-down at 1308 is a search for employee purchases. This will identify all the data on what the employees have been purchasing.

At 1309, the employer types in food items with a financial code 202 of 521. The computer will identify and separate out all the items involving food or snacks with a FC 202 of 521 and identify their totals. At 1310, the employer enters a second search for payroll data, which is from Non-POS 206 data. At 1311, the employer cross indexes the search results with employee ID at 1306 with a FC 202 of 022 as seen on the TCD 207 at 1314 and the transaction data 308 at 1306. At 1313, the FPS 208 locates the employee ID17 1306 paycheck from the payroll file.

At 1313, the employer clicks apply. This function will now be applied to all receipt data the employees are creating and is being sent to the FPS 208 to be processed. Their snacks will be automatically recorded and deducted from every paycheck.

At 1315, is a receipt stub of 1301 to give to the employee when they receive their paycheck. At 1316, is the paycheck stub showing the amount deducted. Note all of the paycheck data has been parsed with FCs 202 so that the paycheck data can be manipulated automatically also. This same function could be applied to restaurant meals and numerous other processes. The employer wants to be able to deduct these items automatically so to apply the algorithm of searching for food items in the transaction data 308 and then cross-indexing with the results with payroll data and automatically deducting the amount from the employee's paycheck, the employer or user just needs to select apply at 1313.

Figure 14:
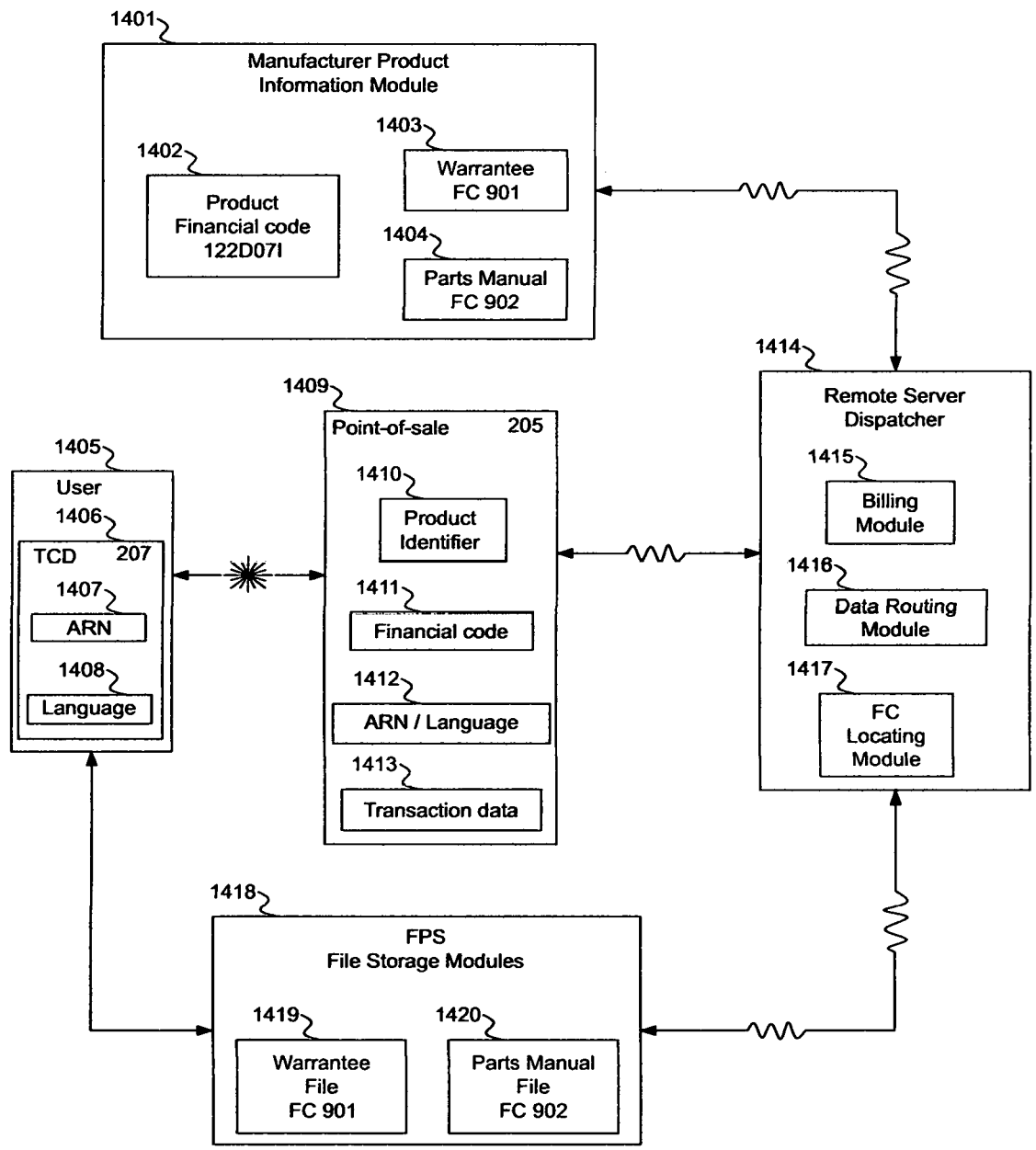
FIG. 14 is a flow chart of how Non-POS data is automatically routed from the manufacturer to the FPS in accordance with at least one embodiment of the claimed subject matter.

Further embodiments in FIG. 14 is a flow chart of how Non-POS 206 data is automatically routed from the manufacturer 1401 to the FPS 208.

At 1401 is the manufacturer 1401. The manufacturer 1401 produces a product and identifies the product with a financial code 1402 of "122 D07I" For this figure the "I" represents "Information is available at the manufacturer" At 1403 and 1404 are two files containing the information associated with the financial code"122D07I" 1402.

At 1405 is the user 1405 that purchases the manufacturer's 1401 product. The purchase proceeds as normal. The product identifier 1402 is scanned and the FC 202 for the product is scanned. There is no FC 202 present so the POS 1409 accesses the remote server 1414 in this instance the dispatcher 1414. The Dispatcher 1414 receives the POS's 1409 request for a FC 1411 associated with the product and manufacturer 1401 as identified by the product identifier 1410 when scanned. The dispatcher accesses the FC 1411 through the FC locating module 1417 at 1417. The dispatcher then transmits the FC 1411 back to the POS 1409 where the POS 1409 inserts the FC 1411 into the sales data 104. The user pays for the product then swipes their TCD 1406 at the POS 1409. The POS 1409 at the time of scanning the TCD 1406 extracts the ARN 1412 and the language 1408 of the user 1405. The POS 1409 then formulates the transaction data 1413 to be sent to the FPS 1418.

The POS 1409 identifies the "I" in the financial code and identifies the language 1408 of the user when the product identifier and the TCD 1406 were scanned. The POS 1409 combines the information in the TCD 1406 into the transaction data 1413. When the POS 1409 transmits the transaction data 1413 to the FPS 1409, the transaction data 1413 is first sent to the dispatcher 1414.

The dispatcher 1414 reads the FC 1411 and identifies that there is information available at the manufacturer 1401 the dispatcher 1414 also identifies the ARN 1407 and other transaction data 1413. The dispatcher 1414 creates two packets of data, the transaction data 1413 to send to the user's FPS 1418 and an information request to send to the manufacturer 1401. The dispatcher's 1414 routing module 1416 routes the user's transaction data 1413 to the FPS 1418 where the transaction data 1413 will be processed. The FPS 1418 identifies a valid ARN 1412 and allows the transaction data 1413 to be inputted. The second packet of data is routed through the dispatcher's data routing module 1416 and identified as a data request from the dispatcher The information packet from the dispatcher 1414 to the manufacturer 1401 includes but is not limited to; the language 1412 of the user the ARN 1412, and the product identifier 1410 from the transaction card 1406.

The manufacturer 1401 receives the data request from the dispatcher 1414. The manufacturer 1401 identifies the FC 1402 in the data packet as one theirs. The manufacturer 1401 also identifies the user's ARN 1407 and language 1408. The manufacturer 1401 uses the "I" in the FC 1402 to identify the request for product information. The manufacturer 1401 then uses the information in the original product identifier 1402 to locate the product information. The manufacturer 1401 locates the product information in the user's language 1408 and creates a return packet of information to be returned to the dispatcher 1414. The FCs 1402 identifying the information, use the same financial codes 1419 that are used to identify the FPS 1418 Warrantee file and Parts manual file in the user's FPS 1418.

The manufacturer 1401 transmits the information packet back along with the warrantee 1403 and parts manual 1404 in the user's language 1408 to the dispatcher 1414. The dispatcher 1414 identifies the information from the manufacturer 1401 by the ARN 1407 of the user's identifying the information packet. The identifying information on the manufacturer's 1401 product information is recorded and sent to the billing module 1415. The product information is then routed through the routing module 1416 and transmitted to the user's FPS 1418. The user's FPS 1418 identifies the ARN 1412 as valid and allows the manufacturer's 1401 information to be inputted. The FPS 1418 identifies the financial codes 1419 & 1420 assigned to the data by the manufacturer 1401 and puts the data in the proper files the warrantee file 1419 identified by the financial code IL901 and the parts manual IL902. The user 1405 now has the product information 1403 & 1404 in their language 1408 and the information has been filed automatically. The warranty is in the warrantee file 1419 with all the other warranties and the same with the parts manual 1420.

Figure 15:
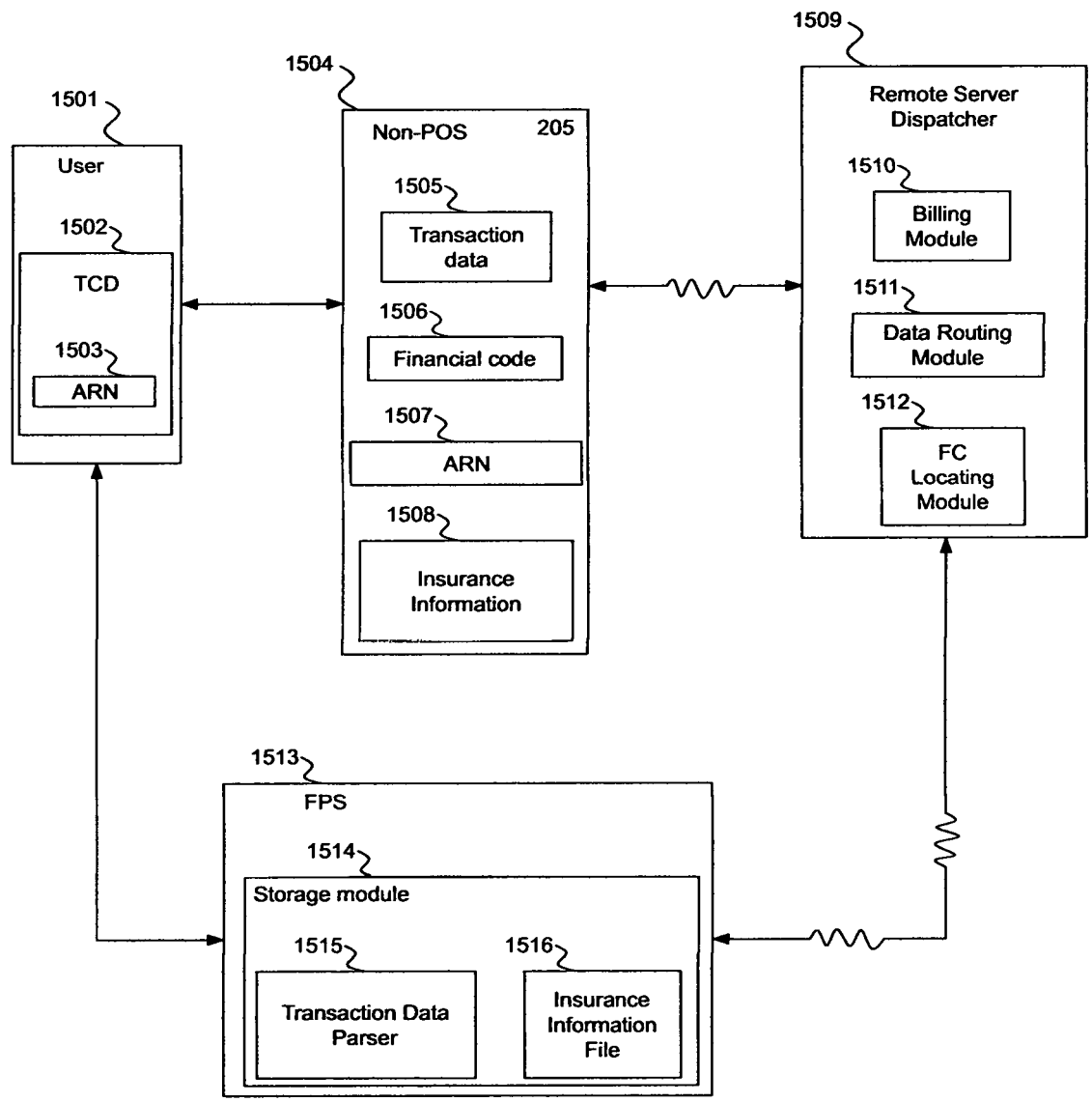
FIG. 15 illustrates an insurance agent or merchant selling an insurance policy to the user in accordance with at least one embodiment of the claimed subject matter.

Further embodiments at FIG. 15 include an insurance agent or merchant selling an insurance policy to the user.

The user 1501 is at their insurance agent's office 1504 and has just completed the purchase of auto insurance. The transaction document can be identified with a financial code before or after the sale. The transaction can be entered into the computer at the time it is drawn up. The insurance information 1508 is also identified with a FC 202. The insurance agent is using a template or other application for insurance agents. The user 1501 swipes or reads off the ARN 1507 on the transaction card 1502. If it is read off, then it will be entered by keyed entry 106. The POS 1504 collects all the information from the transaction and combines it into the transaction data 1505. The transaction data 1505 and insurance information 1508 is then transmitted to the dispatcher's remote server 1509.

The dispatcher 1509 receives the transaction data 1505 and channels the data through the data routing module 1510. The FPS 1513 identifies the ARN 1507 as valid and transmits a valid ARN 1507 code back to the dispatcher where the dispatcher then forwards the valid ARN 1507 to the insurance agent or Non-POS 1504 location. The Insurance agent's computer then transmits the transaction data 1505 and insurance information 1508 to the dispatcher 1509 where the dispatcher 1509 records the data necessary for billing in the billing module 1510. The transaction data 1505 and insurance information 1508 is then transmitted to the FPS 1513 through the data routing module 1511.

The FPS 1513 identifies the data as being a combination of POS 205 and Non-POS 206 data. The transaction data 1505 is routed into a file to be parsed and organized 1505 into a financial report. The insurance document is identified by a financial code 202 identifying it as insurance and is automatically filed into a file for insurance 1516.

This example can be applied to most financial transactions away from a standard POS 205 where there are several types of data being transmitted. It can also serve for a Non-POS 206 transaction where there is only data to be transmitted.

Figure 16:
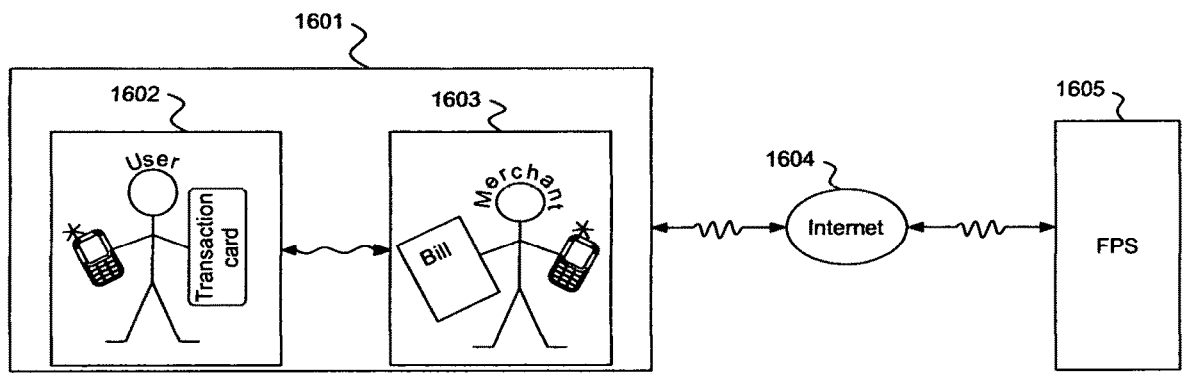
FIG. 16 illustrates a user of the system at a POS transaction comprising the use of mobile phones or other wireless devices in accordance with at least one embodiment of the claimed subject matter.

Further embodiments included in FIG. 16 include a POS user transaction 1601 comprising the use of mobile phones or other wireless devices.

At 1601, is a user 1602 and a merchant 1603 such as a plumber or electrician or any business person that can use their mobile or wireless device as a POS 205. At the same time, the user 1602 can record the transaction if the merchant 1603 does not have a mobile device. Either party can purchase a mobile app. designed to facilitate the invention. A credit card scanner for mobile devices can scan the payment card and the transaction card 207. If no credit card scanner is present, the necessary data including TCD 207 data and the ARN 209 can be keyed in by hand 106. At 1604, is the internet connection for the mobile devices to make contact with the FPS 1606. At 1606 is the FPS 1606 receiving the data from either the user 1602 or the merchant 1603.

At 1601, there is a user 1602 and Internet merchant 1603. If the merchant 1603 is a brick and mortar POS 205 and the merchant 1603 can not process the transaction data 308 and transmit it to the FPS 1606. Then the user 1602 can process the transaction data 308 by using their mobile device to scan the items purchased or by using keyed entry 106, then the mobile device can create the necessary transaction data 308 and transmit it to the FPS 1606.

Figure 17:
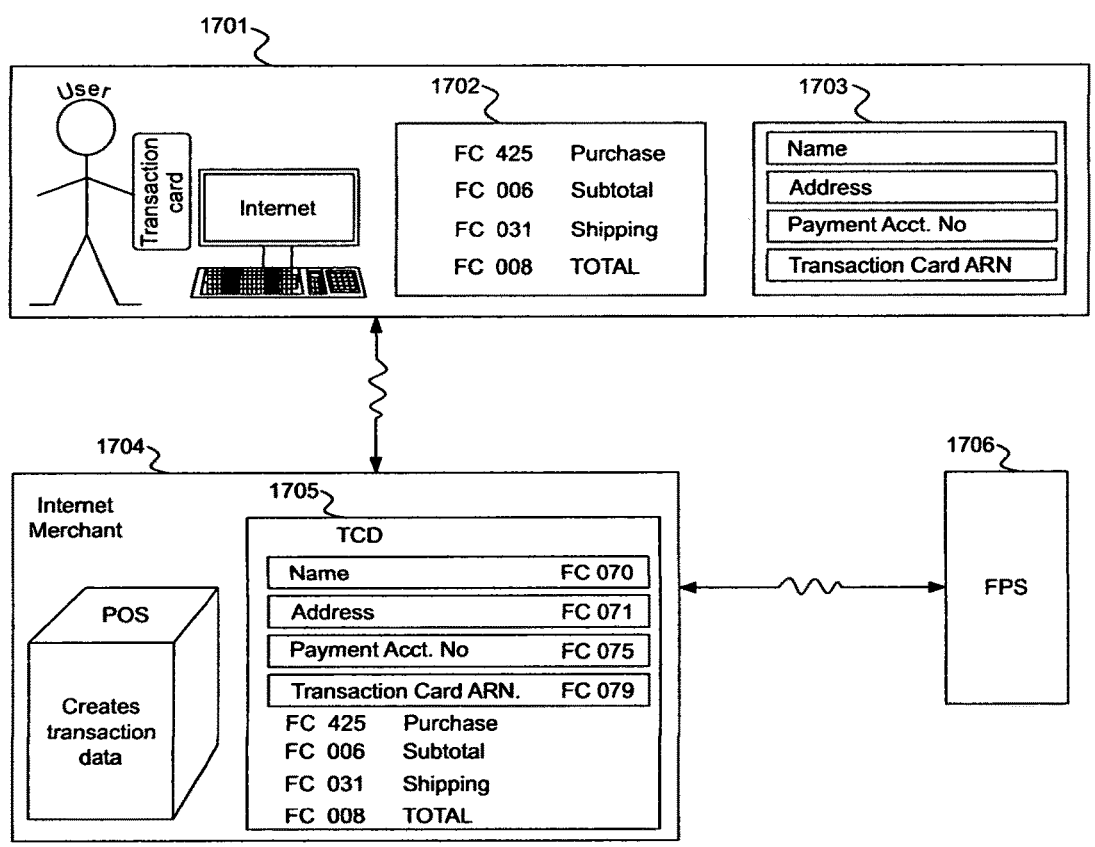
FIG. 17 illustrates an internet transaction between a user and a merchant in accordance with at least one embodiment of the claimed subject matter.

Further embodiments in FIG. 17 include an internet transaction between a user 1701 and a merchant 1704.

At 1701, the user 1701 makes a purchase that has a FC 202 of 425 representing office supplies. At 1702, are some of the details on the purchase. All the other items on the receipt are identified with a financial code 202 including shipping details. At 1703 the user 1701 fills out the form for paying for the item. At the bottom is a place for the user's 1701 FPS 1706 ARN 209. The user 1701 completes the transaction and the transaction data 1705 is recorded at the internet merchant 1704 at 1704. The internet merchant 1704 charges the payment account first. Then the transaction data 1705 is created and sent to the user's FPS 1706 account at 1706.

What is claimed is:

1. A system configured to create a financial report for a user by processing information of the user, financial data of the user, sales data of a point of sale, and product data of a product identifier, the system comprising:
   a set of financial codes comprising a plurality of financial codes used singly or plurally, wherein the plurality of financial codes are related to bookkeeping, accounting and taxes and used to identify the product identifier's product data, the user's information, the user's financial data, the point-of-sale's sales data, wherein the set of financial codes are used by a financial processing and data management software to create the financial report;
   the product identifier configured to store the product data and allowing a first electronic or human extraction of the product data by the point-of-sale, wherein the product data comprises an associated manufacturer's information and the plurality of financial codes when present in the product identifier, wherein the plurality of financial codes identify the associated manufacturer's information;
   a transaction card or device comprising a first memory storing the user's information, wherein the first memory is configured to allow a second electronic or human extraction of the user's information;
   the point-of-sale configured to process and assign the plurality of financial codes to the point-of-sale's sales data, wherein the point-of-sale is configured to assign the plurality of financial codes to a singular or plurality of components comprising the point-of-sale's sales data, wherein the point-of-sale is configured to create a first transaction data by combining the point-of-sale's sales data, the product identifier's product data, and the user's information from the transaction card or device, wherein the first transaction data is formatted in a first organized format retaining the plurality of financial codes, the point-of-sale's sales data, the product identifier's product data, and the user's information from the transaction card or device;
   wherein the point-of-sale is configured to store the plurality of financial codes to a second memory and assign the plurality of financial codes to the point-of-sale's sales data by using the product identifier's product data, and/or accessing the plurality of financial codes by sending an electronic request to a remote server, whereby the remote server assigns the plurality of financial codes to the point-of-sale's sales data;
   the remote server, configured to receive the electronic request from the point-of-sale, wherein the electronic request from the point-of-sale comprises, the point-of-sale's sales data, the product identifier's product data and the user's information from the transaction card or device, wherein the remote server is configured to create a second transaction data by combining the point-of-sale's sales data, the product identifier's product data, and the user's information from the transaction card or device, wherein the second transaction data created by the remote server is formatted in a second organized format retaining the plurality of financial codes, the point-of-sale's sales data, the product identifier's product data, and the user's information from the transaction card or device;
   a non-point-of-sale configured to create and manage the user's financial data, wherein the non-point-of-sale is configured to use a customized software for processing the user's financial data and use the plurality of financial codes to identify the user's financial data, wherein the non-point-of-sale is configured to transmit the user's financial data to the financial processing and data management software and/or the remote server;
   wherein the financial processing and data management software is configured to use the plurality of financial codes as instructions to parse, manage and store the first and/or second transaction data received from the point-of-sale and/or the remote server and the user's financial data from the non-point-of-sale, wherein the financial processing and data management software is configured to use the plurality of financial codes to cross-index and correlate the plurality of financial codes in the first and/or second transaction data and the user's financial data with the plurality of financial codes related to bookkeeping, accounting and taxes stored in an associated with the financial processing and data management software, wherein the financial processing and data management software is configured to use the plurality of financial codes stored in the first and/or second transaction data from the point-of-sale or the remote server and/or the user's financial data from the non-point-of-sale to create the financial report.

2. The system of claim 1, wherein the set of financial codes comprise any combination of human or electronically readable numbers, letters, words, abbreviations, symbols and/or computer character sets.

3. The system of claim 1, wherein the product identifier comprises any two or three dimensional form capable of storing the product's data and allowing for extraction of the product's data, wherein the product's data is human readable and/or electronically scannable.

4. The system of claim 1, wherein the user's information stored in the transaction card or device's first memory comprises, a singular or a plurality of routing numbers, account numbers, email addresses, personal and/or business information.

5. The system of claim 1, wherein the transaction card or device's first memory is configured to be electronically scanned and/or allows a projection of a first electronic transmission of the user's information stored in the transaction card or device, wherein the transaction card or device comprises but is not limited to, a chip or magnetic stripe cards, electronic mobile devices including phones, watches, rings, and portable computers.

6. The system of claim 1, wherein the point-of-sale comprises a plurality of businesses, a plurality of computing hardware and associated devices, wherein the plurality of businesses comprise but are not limited to, brick and mortar stores, internet sites, telephone sales, service companies, utility companies, credit and debit card companies, telephone sales, and companies trading in securities, wherein the plurality of computing hardware and associated devices comprise but are not limited to, point-of-sale registers, computers, mobile phones, tablet computers, scanners and peripheral devices.

7. The system of claim 1, wherein the point-of-sale is configured to electronically scan and extract the product identifier's product data and the plurality of financial codes when present in the product identifier.

8. The system of claim 1, wherein the point-of-sale is configured to electronically extract and/or receive the user's information from the transaction card or device.

9. The system of claim 1, wherein the singular or plurality of components comprising the point-of-sale's sales data comprises a name and address of the point-of-sale, a date and time of purchase, a name of each item purchased, a price of each item purchased, a sub-total, taxes, a total, a shipping amount when applicable and a method of payment.

10. The system of claim 1, wherein the point-of-sale is configured to transmit the first transaction data in a second electronic transmission to the financial processing and data management software and/or the remote server.

11. The system of claim 1, wherein the remote server is configured to have a fourth memory capable of storing the associated manufacturer's information and the plurality of financial codes assigned to identify the associated manufacturer's information.

12. The system of claim 11, wherein the remote server is configured to assign the plurality of financial codes to the point-of-sale's sales data transmitted from the point-of-sale, by accessing the associated manufacturer's information stored in the fourth memory of the remote server and correlating the associated manufacturer's information with the associated manufacturer's information in the point-of-sale's sales data wherein the plurality of financial codes identifying the associated manufacturer's information are extracted and inputted into the point-of-sales sales data.

13. The system of claim 1, wherein the remote server is configured to transmit the second transaction data in a third electronic transmission to the point-of-sale and/or the financial processing and data management software.

14. The system of claim 1, wherein the non-point-of-sale comprises a plurality of locations and a plurality of devices to create, process and transmit the user's financial data, with the plurality of locations comprising, but is not limited to banks, credit card companies, securities and brokerage firms, insurance companies, wire transfer services and other businesses or entities involved in managing and/or manipulating money, wherein the plurality of devices comprise, but is not limited to computers and associated devices, capable of creating, processing and transmitting the user's financial data.

15. The system of claim 13, wherein the non-point-of-sale is configured to transmit the user's financial data in a fourth electronic transmission to the financial processing and data management software and/or the remote server.

16. The system of claim 15, wherein the financial processing and data management software has a receiving component configured to receive the second, third and fourth electronic transmissions from the point-of-sale, the remote server, and/or the non-point-of-sale, wherein the second, third and fourth electronic transmissions contain the first transaction data from the point-of-sale and/or the second transaction data from the remote server and the user's financial data from the non-point-of-sale.

17. The system of claim 1, wherein the financial processing and data management software is configured to allow editing of the plurality of financial codes.

18. A method of creating a financial report for a user by combining and managing a product's data, a point-of-sale's sales data, information of the user and financial data of the user, the method comprising:

generating a set of financial codes, wherein the set of financial codes comprise a plurality of financial codes used singly and/or plurally and are used for identifying a product identifier's product data, the user's information stored in a transaction card or device, the point-of-sale's sales data, and the user's financial data produced by a non-point-of-sale, wherein the plurality of financial codes are used for identifying a singular or a plurality of components comprising the point-of-sale's sales data, wherein the plurality of financial codes are used by a remote server for storing and using the plurality of financial codes for identifying the point-of-sale's sales data and assigning the plurality of financial codes to the singular or the plurality of components comprising the point-of-sale's sales data, wherein the plurality of financial codes are used by a financial processing and data management software for identifying bookkeeping, accounting and tax procedures;

storing by the product identifier the product's data, wherein the product's data comprises an associated manufacturer's information identifying a product and the plurality of financial codes when present in the product identifier;

storing by the transaction card or device the user's information;

electronically scanning by the point-of-sale the product identifier and the transaction card or device, whereby extracting the product identifier's product data and the user's information from the transaction card or device;

the point-of-sale creating a first transaction data comprising, the product identifier's product data, the user's information from the transaction card or device and the point-of-sale's sales data, wherein the first transaction data is formatted in a first organized format retaining the plurality of financial codes, the point-of-sale transmitting a first electronic transmission containing the first transaction data to the financial processing and data management software, and/or the point-of-sale transmitting a second electronic transmission to the remote server, wherein the second electronic transmission comprises the product identifier's product data, the point-of-sale's sales data and the user's information from the transaction card or device;

the remote server receiving the second electronic transmission from the point-of-sale the remote server creating a second transaction data by combining the point-of-sale's sales data, the product identifier's product data and the user's information from the transaction card or device, wherein the second transaction data is formatted in a second organized format retaining the plurality of financial codes, the remote server transmitting a third electronic transmission containing the second transaction data to the financial processing and data management software and/or the point-of-sale;

the non-point-of-sale processing and managing the user's financial data, wherein the non-point-of-sale transmits a fourth electronic transmission containing the user's financial data to the financial processing and data management software and/or the remote server;

the financial processing and data management software processing the first and the second transaction data from the point-of-sale and/or the remote server, wherein the financial processing and data management software uses the plurality of financial codes in the first and/or the second transaction data and the user's financial data from the non-point-of-sale as instructions for parsing, managing and storing the first and/or the second transaction data and the user's financial data, wherein the financial processing and data management software includes cross-indexing and correlating the plurality of financial codes in the first and/or the second transaction data and the user's financial data from the non-point-of-sale with the plurality of financial codes stored in a first memory associated with the financial processing and data management software, whereby creating the financial report, wherein the financial report is related to bookkeeping, accounting and/or taxes for the user.

19. The method of claim 18, wherein the singular or plurality of components comprising the point-of-sale's sales data comprise a name and address, a date and time, a name of the product purchased, a price, a sub-total, a sales tax, a total, a shipping amount when applicable and a method of payment.

20. The method of claim 18, wherein the transaction card or device comprises, any two or three dimensional form that has an electronically accessible memory capable of storing the user's information and allows the extracting of the user's information, wherein the extracting of the user's information from the transaction card or device comprises, being human readable, electronically scannable and/or the transaction card or device wirelessly transmitting an electronic transmission of the user's information.

21. The method of claim 18, wherein the transaction card or device comprises, the user's information stored in the electronically accessible memory of the transaction card or device comprises a singular or plurality of routing numbers, account numbers, email addresses, personal information and/or business information.

22. The method of claim 18, further comprising, a human entering of the product's data and/or the user's information into the point-of-sale, whereby the point-of-sale inputs the product's data and the user's information into the first transaction data.

23. The method of claim 18, wherein, when the plurality of financial codes are not stored in the product identifier the plurality of financial codes are located by the point-of-sale using the associated manufacturer's information extracted from the product's data, and then locating the associated manufacturer's information stored in a third memory associated with the point-of-sale, wherein the plurality of financial codes stored in the third memory associated with the point-of-sale, are identified by the associated manufacturer's information, whereby the point-of-sale is capable of matching and correlating the associated manufacturer's information, whereby determining the plurality of financial codes to be inputted into the point-of-sales sales data.

24. The method of claim 23, wherein processing by the remote server comprises, the remote server locating the plurality of financial codes using the associated manufacturer's information extracted from the product's data, then locating the associated manufacturer's information stored in a fourth memory associated with the remote server, wherein the plurality of financial codes are identified by the manufacture's information stored in the fourth memory associated with the remote server, whereby the remote server is capable of matching and correlating the associated manufacturer's information, whereby determining the plurality of financial codes to be inputted into the point-of-sales sales data.

25. The method of claim 18, wherein processing by the non-point-of-sale comprises, the user's financial data comprises banking data, credit card transactions, securities management, wire transfers and other processes involved in managing and/or manipulating money.

26. The method of claim 18, wherein processing by the financial processing and data management software comprises, the financial processing and data management software receiving the first and the third electronic transmissions containing the first and second transaction data from the point-of-sale and/or the remote server and/or the user's financial data from the non-point-of-sale.

27. The method of claim 18, wherein processing by the financial processing and data management software comprises editing of the plurality of financial codes by the user.

* * * * *